(12) United States Patent
Heller et al.

(10) Patent No.: US 7,797,446 B2
(45) Date of Patent: Sep. 14, 2010

(54) METHOD AND SYSTEM FOR UPDATING PLAYLISTS

(75) Inventors: David Heller, San Jose, CA (US); Jeffrey L. Robbin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 505 days.

(21) Appl. No.: 10/198,639

(22) Filed: Jul. 16, 2002

(65) Prior Publication Data

US 2006/0168340 A1 Jul. 27, 2006

(51) Int. Cl.
*G06F 15/173* (2006.01)
(52) U.S. Cl. ............... 709/242; 709/219; 707/E17.109; 707/104.1
(58) Field of Classification Search ............... 709/242; 386/44, 55, 14, 6, 52, 68, 69; 385/104–105, 385/83; 707/200, 102
See application file for complete search history.

(56) References Cited

U.S. PATENT DOCUMENTS

| | | | |
|---|---|---|---|
| 3,990,710 A | 11/1976 | Hughes | |
| 4,528,643 A | 7/1985 | Freeny, Jr. | |
| 4,851,931 A | 7/1989 | Parker et al. | |
| 5,168,481 A | 12/1992 | Culbertson et al. | |
| 5,181,107 A | 1/1993 | Rhoades | |
| 5,191,573 A | 3/1993 | Hair | |
| 5,341,350 A | 8/1994 | Frank et al. | |
| 5,355,302 A | 10/1994 | Martin et al. | |
| 5,418,713 A | 5/1995 | Allen | |
| 5,428,735 A | 6/1995 | Kahl et al. | |
| 5,481,509 A | 1/1996 | Knowles | |
| 5,504,852 A | 4/1996 | Thompson-Rohrlich | |
| 5,559,945 A | 9/1996 | Beaudet et al. | |
| 5,561,604 A | 10/1996 | Buckley et al. | |
| 5,566,353 A | 10/1996 | Cho et al. | |
| 5,583,993 A | 12/1996 | Foster et al. | |
| 5,587,404 A | 12/1996 | Kroner et al. | |
| 5,616,876 A | 4/1997 | Cluts | |
| 5,633,839 A | 5/1997 | Alexander et al. | |
| 5,640,566 A | 6/1997 | Victor et al. | |
| 5,666,530 A | 9/1997 | Clark et al. | |
| 5,710,922 A | 1/1998 | Alley et al. | |
| 5,714,971 A | 2/1998 | Shalit et al. | |
| 5,721,949 A | 2/1998 | Smith et al. | |

(Continued)

FOREIGN PATENT DOCUMENTS

EP 0 917 077 5/1999

(Continued)

OTHER PUBLICATIONS

"Apple Introduces iTunes—World's Best and Easiest To Use Jukebox Software," Macworld Expo, San Francisco, Jan. 9, 2001.

(Continued)

*Primary Examiner*—Yves Dalencourt

(57) ABSTRACT

Improved techniques for automatic (or dynamic) updating (or maintaining) of playlists for a media system that stores and plays media content for a user of the media system. The automatic update to playlists can occur when additional media content is added to or removed from the media system. The automatic update to playlists can also occur when previously stored media content is otherwise altered.

26 Claims, 20 Drawing Sheets

U.S. PATENT DOCUMENTS

| | | | |
|---|---|---|---|
| 5,726,909 A | 3/1998 | Krikorian | |
| 5,727,202 A | 3/1998 | Kucala | |
| 5,734,823 A | 3/1998 | Saigh et al. | |
| 5,739,451 A | 4/1998 | Winksy et al. | |
| 5,740,134 A | 4/1998 | Peterson | |
| 5,819,160 A | 10/1998 | Foladare et al. | |
| 5,835,721 A | 11/1998 | Donahue et al. | |
| 5,835,732 A | 11/1998 | Kikinis et al. | |
| 5,845,282 A | 12/1998 | Alley et al. | |
| 5,864,868 A | 1/1999 | Contois | |
| 5,875,110 A | 2/1999 | Jacobs | |
| 5,897,642 A | 4/1999 | Capossela et al. | |
| 5,918,213 A | 6/1999 | Bernard et al. | |
| 5,918,303 A | 6/1999 | Yamaura et al. | |
| 5,923,757 A | 7/1999 | Hocker et al. | |
| 5,925,843 A | 7/1999 | Miller et al. | |
| 5,963,916 A | 10/1999 | Kaplan | |
| 5,969,283 A | 10/1999 | Looney et al. | |
| 5,983,069 A | 11/1999 | Cho et al. | |
| 5,995,098 A | 11/1999 | Okada et al. | |
| 6,000,000 A | 12/1999 | Hawkins et al. | |
| 6,006,274 A | 12/1999 | Hawkins et al. | |
| 6,038,199 A | 3/2000 | Pawlowski et al. | |
| 6,041,023 A | 3/2000 | Lakhansingh | |
| 6,052,797 A | 4/2000 | Ofek et al. | |
| 6,061,306 A | 5/2000 | Buchheim | |
| 6,125,369 A | 9/2000 | Wu et al. | |
| 6,172,948 B1 | 1/2001 | Keller et al. | |
| 6,208,044 B1 | 3/2001 | Viswanadham et al. | |
| 6,216,131 B1 | 4/2001 | Liu et al. | |
| 6,243,328 B1 | 6/2001 | Fenner et al. | |
| 6,243,725 B1 | 6/2001 | Hempleman et al. | |
| 6,247,135 B1 | 6/2001 | Feague | |
| 6,248,946 B1 | 6/2001 | Dwek | |
| 6,255,961 B1 | 7/2001 | Van Ryzin et al. | |
| 6,272,545 B1 | 8/2001 | Flanagin et al. | |
| 6,283,764 B2 | 9/2001 | Kajiyama et al. | |
| 6,295,541 B1 | 9/2001 | Bodnar et al. | |
| 6,332,175 B1 | 12/2001 | Birrell et al. | |
| 6,338,044 B1 | 12/2001 | Birrell et al. | |
| 6,341,316 B1 | 1/2002 | Kloba et al. | |
| 6,356,971 B1 | 3/2002 | Katz et al. | |
| 6,380,947 B1 | 4/2002 | Stead | |
| 6,389,467 B1 | 5/2002 | Eyal | |
| 6,407,750 B1 | 6/2002 | Gioscia et al. | |
| 6,434,680 B2 | 8/2002 | Belknap et al. | |
| 6,446,080 B1 | 9/2002 | Van Ryzin et al. | |
| 6,452,609 B1 | 9/2002 | Katinsky et al. | |
| 6,453,281 B1 | 9/2002 | Walters et al. | |
| 6,490,432 B1 | 12/2002 | Wegener et al. | |
| 6,493,758 B1 | 12/2002 | McLain | |
| 6,523,124 B1 | 2/2003 | Lunsford et al. | |
| 6,529,804 B1 | 3/2003 | Draggon et al. | |
| 6,563,769 B1 | 5/2003 | Van Der Meulen | |
| 6,587,403 B1 | 7/2003 | Keller et al. | |
| 6,587,404 B1 | 7/2003 | Keller et al. | |
| 6,621,768 B1 | 9/2003 | Keller et al. | |
| 6,636,873 B1 | 10/2003 | Carini et al. | |
| 6,664,981 B2 | 12/2003 | Ashe et al. | |
| 6,665,803 B2 | 12/2003 | Lunsford et al. | |
| 6,718,348 B1 | 4/2004 | Novak et al. | |
| 6,721,489 B1 * | 4/2004 | Benyamin et al. | 386/46 |
| 6,731,312 B2 | 5/2004 | Robbin | |
| 6,760,721 B1 | 7/2004 | Chasen et al. | |
| 6,763,345 B1 | 7/2004 | Hempleman et al. | |
| 6,779,019 B1 | 8/2004 | Mousseau et al. | |
| 6,785,542 B1 | 8/2004 | Blight et al. | |
| 6,794,566 B2 | 9/2004 | Pachet | |
| 6,801,964 B1 | 10/2004 | Mahdavi | |
| 6,874,037 B1 | 3/2005 | Abram et al. | |
| 6,928,433 B2 | 8/2005 | Goodman et al. | |
| 6,933,433 B1 | 8/2005 | Porteus et al. | |
| 6,941,324 B2 | 9/2005 | Plastina et al. | |
| 6,978,127 B1 | 12/2005 | Bulthuis et al. | |
| 6,987,221 B2 * | 1/2006 | Platt | 84/601 |
| 7,043,477 B2 | 5/2006 | Mercer et al. | |
| 7,055,165 B2 | 5/2006 | Connelly | |
| 7,111,009 B1 * | 9/2006 | Gupta et al. | 707/102 |
| 7,126,770 B1 | 10/2006 | Arai et al. | |
| 7,209,633 B1 | 4/2007 | Novak et al. | |
| 7,228,298 B1 | 6/2007 | Raines | |
| 7,262,357 B2 * | 8/2007 | Plastina et al. | 84/615 |
| 7,272,385 B2 | 9/2007 | Mirouze et al. | |
| 7,502,626 B1 | 3/2009 | Lemilainen | |
| 2001/0004310 A1 | 6/2001 | Kono | |
| 2001/0011308 A1 | 8/2001 | Clark et al. | |
| 2001/0021053 A1 | 9/2001 | Colbourne et al. | |
| 2001/0041021 A1 | 11/2001 | Boyle et al. | |
| 2001/0044835 A1 | 11/2001 | Schober et al. | |
| 2001/0048642 A1 | 12/2001 | Berhan | |
| 2001/0052123 A1 | 12/2001 | Kawai | |
| 2002/0002413 A1 | 1/2002 | Tokue | |
| 2002/0010788 A1 | 1/2002 | Nathan et al. | |
| 2002/0013784 A1 | 1/2002 | Swanson | |
| 2002/0016968 A1 | 2/2002 | Nathan et al. | |
| 2002/0046315 A1 | 4/2002 | Miller et al. | |
| 2002/0055934 A1 | 5/2002 | Lipscomb et al. | |
| 2002/0073167 A1 | 6/2002 | Powell et al. | |
| 2002/0080180 A1 | 6/2002 | Mander et al. | |
| 2002/0116082 A1 | 8/2002 | Gudorf | |
| 2002/0118300 A1 | 8/2002 | Middleton et al. | |
| 2002/0133515 A1 | 9/2002 | Kagle et al. | |
| 2002/0138606 A1 | 9/2002 | Robison | |
| 2002/0152278 A1 | 10/2002 | Pontenzone et al. | |
| 2002/0161865 A1 | 10/2002 | Nguyen | |
| 2002/0174269 A1 | 11/2002 | Spurgat et al. | |
| 2002/0194195 A1 | 12/2002 | Fenton et al. | |
| 2002/0194309 A1 | 12/2002 | Carter et al. | |
| 2003/0013493 A1 | 1/2003 | Irimajiri et al. | |
| 2003/0014767 A1 | 1/2003 | Stumphauzer | |
| 2003/0030733 A1 | 2/2003 | Seaman et al. | |
| 2003/0037254 A1 | 2/2003 | Fischer et al. | |
| 2003/0046434 A1 | 3/2003 | Flanagin et al. | |
| 2003/0050058 A1 | 3/2003 | Walsh et al. | |
| 2003/0055723 A1 | 3/2003 | English | |
| 2003/0074457 A1 | 4/2003 | Kluth | |
| 2003/0079038 A1 | 4/2003 | Robbin et al. | |
| 2003/0093340 A1 | 5/2003 | Krystek et al. | |
| 2003/0098893 A1 | 5/2003 | Makinen | |
| 2003/0112279 A1 | 6/2003 | Irimajiri | |
| 2003/0167318 A1 | 9/2003 | Robbin et al. | |
| 2003/0182315 A1 * | 9/2003 | Plastina et al. | 707/200 |
| 2003/0191756 A1 | 10/2003 | Oh | |
| 2003/0206203 A1 | 11/2003 | Ly | |
| 2003/0210821 A1 | 11/2003 | Yogeshwar et al. | |
| 2003/0221541 A1 | 12/2003 | Platt | |
| 2004/0001395 A1 | 1/2004 | Keller et al. | |
| 2004/0001396 A1 | 1/2004 | Keller et al. | |
| 2004/0017997 A1 | 1/2004 | Cowgill | |
| 2004/0027930 A1 | 2/2004 | Kudo | |
| 2004/0055446 A1 | 3/2004 | Robbin et al. | |
| 2004/0076086 A1 | 4/2004 | Keller et al. | |
| 2004/0083480 A1 | 4/2004 | Dodge | |
| 2004/0103102 A1 | 5/2004 | Nelson | |
| 2004/0123725 A1 | 7/2004 | Kim | |
| 2004/0128277 A1 | 7/2004 | Mander et al. | |
| 2004/0139180 A1 | 7/2004 | White et al. | |
| 2004/0205028 A1 | 10/2004 | Verosub et al. | |
| 2004/0225762 A1 | 11/2004 | Poo | |
| 2004/0261064 A1 | 12/2004 | Goldstein et al. | |
| 2005/0055718 A1 | 3/2005 | Stone | |
| 2005/0060264 A1 | 3/2005 | Schrock et al. | |
| 2005/0080915 A1 | 4/2005 | Shoemaker | |
| 2005/0149392 A1 | 7/2005 | Gold et al. | |

| | | | |
|---|---|---|---|
| 2005/0240494 | A1 | 10/2005 | Cue et al. |
| 2005/0240661 | A1 | 10/2005 | Heller et al. |
| 2005/0249080 | A1 | 11/2005 | Foote et al. |
| 2005/0262528 | A1* | 11/2005 | Herley et al. .................. 725/19 |
| 2005/0267803 | A1 | 12/2005 | Patel et al. |
| 2005/0278377 | A1 | 12/2005 | Mirrashidi et al. |
| 2006/0015378 | A1 | 1/2006 | Mirrishidi et al. |
| 2006/0036567 | A1 | 2/2006 | Tan |
| 2006/0066627 | A1 | 3/2006 | Gerhard et al. |
| 2006/0089949 | A1 | 4/2006 | Robbin et al. |
| 2006/0100978 | A1 | 5/2006 | Heller et al. |
| 2006/0156236 | A1 | 7/2006 | Heller et al. |
| 2006/0156239 | A1 | 7/2006 | Jobs |
| 2006/0163358 | A1 | 7/2006 | Biderman |
| 2006/0168340 | A1 | 7/2006 | Heller et al. |
| 2006/0247980 | A1 | 11/2006 | Mirrashidi et al. |
| 2008/0256378 | A1 | 10/2008 | Guillorit |
| 2009/0063496 | A1 | 3/2009 | Cunningham et al. |
| 2009/0063543 | A1 | 3/2009 | Martin et al. |

FOREIGN PATENT DOCUMENTS

| | | |
|---|---|---|
| EP | 0 982 732 | 3/2000 |
| EP | 1 028 425 | 8/2000 |
| EP | 1 548 740 | 6/2005 |
| JP | 2000-339917 | 12/2000 |
| JP | 2001-76465 | 3/2001 |
| JP | 2001-93226 | 4/2001 |
| JP | 2001-117800 | 4/2001 |
| JP | 2001-291365 A | 10/2001 |
| JP | 2002-74909 A | 3/2002 |
| WO | WO 95/16950 | 6/1995 |
| WO | WO 01/33569 | 5/2001 |
| WO | WO 01/67753 A1 | 9/2001 |
| WO | WO 02/25610 | 3/2002 |
| WO | WO 02/25935 | 3/2002 |
| WO | WO 03/023786 | 3/2003 |
| WO | WO 2004-004338 | 1/2004 |
| WO | WO 2004/084413 | 9/2004 |
| WO | 2005073856 A2 | 8/2005 |

OTHER PUBLICATIONS iTunes, Playlist Related Help Screens, iTunes v1.0, Apple Computer, Inc., Jan. 2001.
"Apple Announces iTunes 2," Press Release, Apple Computer, Inc., Oct. 23, 2001.
Specification Sheet, iTunes 2, Apple Computer, Inc., Oct. 31, 2001.
iTunes 2, Playlist Related Help Screens, iTunes v2.0, Apple Computer, Inc., Oct. 23, 2001.
SoundJam MP Plus, Representative Screens, published by Casady & Greene, Inc., Salinas, CA, 2000.
"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.
De Herrera, Chris, "Microsoft ActiveSync 3.1," Version 1.02, Oct. 13, 2000.
IEEE 1394—Wikipedia, 1995, http://www.wikipedia.org/wiki/Firewire.
Miniman, "Applian Software's Replay Radio and Player v1.02," Product review, pocketnow.com, http://www.pocketnow.com/reviews/replay/replay.htm, Jul. 31, 2001.
Personal Jukebox (PJB), "Systems Research Center and PAAD," Compaq Computer Corp., Oct. 13, 2000, http://research.compaq.com/SRC/pjb/.
Compaq, "Personal Jukebox," Jan. 24, 2001, http://research.compaq.com/SRC/pjb/.
Steinberg, "Sonicblue Rio Car," Product Review, Dec. 12, 2000, http://electronics.cnet.com/electronics/0-6342420-1304-4098389.html.
Andrew Birrell, "Personal Jukebox (PJB)," Oct. 13, 2000, http://birrell.org/andrew/talks/pjb-overview.ppt.
Travis Butler, "Portable MP3: The Nomad Jukebox," Jan. 8, 2001, http://db.tidbits.com/getbits.acgi?tbart=06261.
Travis Butler, "Archos Jukebox 6000 Challenges Nomad Jukebox," Aug. 13, 2001, http://db.tidbits.com/getbits.acgi?tbart=06521.
Adam C. Engst, "SoundJam Keeps on Jammin'," Jun. 19, 2000, http://db.tidbits.com/getbits.acgi?tbart=05988.
Musicmatch, "Musicmatch and Xing Technology Introduce Musicmatch Jukebox," May 18, 1998, http://www.musicmatch.com/info/company/press/releases/?year=1998&release=2.
"Nomad Jukebox," User Guide, Creative Technology Ltd., Version 1, Aug. 2000.
"Apple's iPod Available in Stores Tomorrow," Press Release, Apple Computer, Inc., Nov. 9, 2001.
"Digital Still Cameras—Downloading Images to a Computer," Mimi Chakarova et al., Multi-Media Reporting and Convergence, 2 pgs.
U.S. Appl. No. 10/833,399, filed Apr. 27, 2004.
U.S. Appl. No. 10/833,879, filed Apr. 27, 2004.
U.S. Appl. No. 10/973,925, filed Oct. 25, 2004.
U.S. Appl. No. 11/097,591, filed Apr. 1, 2005.
U.S. Appl. No. 11/097,034, filed Apr. 1, 2005.
International Search Report dated Jul. 9, 2003, from International Application No. PCT/US03/21534.
Handbook for Palm™ m500 Series Handhelds, User Manual.
Sinitsyn, "A Synchronization Framework for Personal Mobile Servers," Proceedings of the Second IEEE Annual Conference on Pervasive Computing and Communications Workshops, Piscataway, NJ, Mar. 14, 2004, pp. 1-4.
Vetro et al., "Media Conversions to Support Mobile Users," IEEE Canadian Conference on Electrical and Computer Engineering, Piscataway, NJ, May 13, 2001, pp. 607-612.
Zheng et al., "MobiGATE: a mobile gateway proxy for the active deployment of transport entities," Proceedings of the 2004 International Conference on Parallel Processing, Piscataway, NJ, Aug. 15, 2004.
RCA Lyra User's Guide, RD2201/2202/2204, www.lyrazone.com, pp. 1-37.
Lyra, Personal Digital Player, RCA, Product Box.
Compaq Computer Corp., copyright 1991, Personal Jukebox User Manual, pp. 1-29.
"About MusicMatch Jukebox," MusicMatch Jukebox v4 Help, pp. 1-4.
RealJukebox Plus Manual, Real Networks, Inc., copyright 1999, pp. 1-83.
RealJukebox, Real Networks, Inc., webpages downloaded Oct. 27, 2005 http://www.real.com/Jukebox/release_notes.html#.
TuneBase 100 User Guide, A CD Library Management System, Escient, Inc. copyright 1999.
TuneBase Pro Mk-II User's Guide, Escient, Inc.
Window's Media Player 6.4, Microsoft Corp., copyright 1999, software available at http://www.oldversion.com/program.php?n=wmp See also Windows Media Player 6.4 Software Official website at http://www.microsoft.com/windows/windowsmedia/player/version64/default.aspx.
Bridgman, "Windows XP Expert Zone Community Columist", Using Windows Mobil-based Portable Media Centers and Windows Media Player 10, Aug. 25, 2004, 1-11.
U.S. Appl. No. 10/936,233, filed Sep. 7, 2004.
U.S. Appl. No. 11/138,004, filed May 25, 2005.
U.S. Appl. No. 11/114,914, filed Apr. 25, 2005.
U.S. Appl. No. 11/454,060, filed Jun. 14, 2006.
PBS Local Insertion Server Instruction Manual, Microvision, Inc., pp. 1-71, Jun. 19, 1996.
Wave Station Digital Audio Automation System, Instruction & Operations Manual Broadcast Software International, pp. 1-113, Feb. 4, 1997.
Nielsen et al., "Comparative Design Review: An Exercise in Parallel Design", Interchi '93, pp. 414-417Apr. 24-29, 1993.
Lowery Daryl, "Random-Access Digital Audio—Recording Systems", pp. 68-71, Jun. 1992.
Sadie Master System, Product Brochure, Studio audio Digital Equipment Inc., 2 pgs., Jan. 1995.
RCS Works-Cart Wall User's Guide and Reference Manual, pp. 1-83, Feb. 7, 1993.

"Digital Audio Just Got Easier!", CartWorks Digital Audio Systems, dbm Systems, Inc., Jun. 26, 1996.

"CartWorks File Utilities User's Manual", dbm Systems, Inc., pp. 1-8, Jul. 1998.

"CartWorks MHD Music-on-Hard-Drive QuickSchedule User's Manual", dbm Systems, Inc., pp. 1-8, Feb. 8, 1998.

"CartWorks MHD Music-on-Hard-Drive User's Manual V6.8", dbm Systems, Inc., pgs. 1-11, Feb. 1998.

"CartWorks On-Demand Editor User's Manual", dbm Systems, Inc., pp. 1-7, Feb. 1998.

"CartWorks Script Editor User's Manual v3.12", dbm Systems, Inc., pp. 1-26, Feb. 1998.

"CartWorks Spot Set Editor User's Manual", dbm Systems, Inc., pp. 1-11, Feb. 1998.

"The DADpro Digital Audio Delivery System Operation Manual Version 1.0", IBM Corp., pp. 1-424, Aug. 30, 1996.

"Virtual Recorder—Basic Operations", ASC Audio Video Corporation, pp. 1-94, Sep. 9, 1996.

"Broadcast Tools: SpotBase, Playlist & TapeBase", ASC Audio Video Corporation, pp. 1-2, Mar. 1998.

"VR 300 Advanced Broadcast Video Server", ASC Audio Video Corporation, pp. 1-9, Mar. 1998.

"VR300 Video Server User Manual, Version 1.0", ASC Audio Video Corporation, pp. 1-40, Mar. 20, 1998.

"Gravis WinDecks Version 1.12", screen shots, Gravis Computer Technology Ltd., pp.1-10, Jan. 1990.

WinDecks, User Instructions, Gravis Computer Technology Ltd., pp. 1-14, Jan. 1990.

Replay Gain, "Replay Gain—A proposed Standard," Oct. 7, 2001, available from http://replaygain.hydrogenaudio.org/index.html and http://replaygain.hydrogenaudio.org/outline.html.

"Nomad Jukebox," User Guide, Creative Technology Ltd., Version 1, Aug. 2000.

Office Action from European Patent Office for European Patent Application No. 03764426.7 dated Nov. 8, 2005+A90.

Glenn Fleishman, "Handheld iPod joins MP3 band a bit late, but is standout player," Nov. 6, 2001, http://seattletimes.nwsource.com/html/businesstechnology/134361811_ptmacc040.html.

"Hewlett Packard Jornada 525 Color Pocket PC," downloaded Jan. 25, 2002, http://www.pc4d.com/electronics/products/56/jornada_525_color_pocket_pc.shtml.

iTunes, Digital Music for your Mac, Apple Computer, Inc., downloaded Oct. 22, 2001, http://www.apple.com/itunes/.

"Rio Portable Music Player," Web Review, downloaded Jan. 25, 2002, http://www.webreviews.com/9901/rio.html.

Andy Lindauer, "What's in your Pocket?," Edgereview, downloaded Jan. 25, 2002, http://www.edgereview.com/print.cfm?Type=aag&ID=286.

RCA Lyra User's Guide, RD2201/2202/2204, www.lyrazone.com, pp. 1-37, 1999.

Lyra, Personal Digital Player, RCA, Product Box, 2003.

"About MusicMatch Jukebox," MusicMatch Jukebox v4 Help, pp. 1-4, 1999.

TuneBase Pro Mk-II User's Guide, Escient, Inc., 1999.

"Digital Still Cameras — Downloading Images to a Computer," Mimi Chakarova et al., Multi-Media Reporting and Convergence, 2 pgs., Jan. 18, 2006.

"Notification of Reason for Rejection" for Japanese Patent Application, 2004-521604, mailed Apr. 15, 2008 (with translation).

Personal Jukebox (PJB), "System Research Center and PAAD", Compaq Computer Corp., Oct. 13, 2000, http;//research.compaq.com/SRC/pjb/.

Etchison, "Accelerated Discrete Adjustment of the Parameters of a Process", IBM Technical Disclosure Bulletin, vol. 15, No. 5, Oct. 1, 1972, 2 pgs.

Office Action from European Patent Office for 03764426.7 mailed Aug. 14, 2006.

Office Action from European Patent Office for 03764426.7 mailed Nov. 8, 2005.

Windows XP Service Pack 2, Figures 1-2 and "How to obtain the latest Windows XP service pack," Aug. 25, 2004.

Torrone, Phillip, How-To: Getting Podcasts on a Portable Media Center (and other Windows Media Devices, Oct. 2004.

Office Action for European Patent Office for 03764426 7 mailed Sep. 11, 2009.

Notification for Reason for Rejection for Japanese Patent Application 2004-521604, mailed Jun. 16, 2009 (with translations).

Written Opinion for PCT/US03/21534 mailed Mar. 12, 2004.

International Preliminary Examination Report for PCT/US/21534 mailed Jun. 8, 2004.

"iTunes Celebrates Its First Anniversary; Over 70 Million Songs Purchased," Apr. 28, 2004, http://www.apple.com/pr/library/2004/apr/28itunes.html.

Breen, Christopher, "iMixing it Up: Sharing Your Sounds," Sep. 17, 2004, http://playlistmag.com/help/2004/09/imixhowto/index.php.

Kawamoto et al., "On 1$^{st}$ Birthday, iTunes Unwraps New Features," Apr. 28, 2004, http://news.com.com/On+1st+birthday,+iTunes+unwraps+new+features/2100- 1027_3-5201598.html.

Office Action from European Patent Office for 03764426.7 mailed Aug. 14, 2006.

Office Action from European Patent Office for 03764426.7 mailed Nov. 8, 2005.

Windows XP Service Pack 2, Figures 1-2 and "How to obtain the latest Windows XP service pack," Aug. 25, 2004.

Notification for Reason for Rejection for Japanese Patent Application 2004-521604, mailed Mar. 9, 2010 (with translations).

* cited by examiner

METHOD AND SYSTEM FOR UPDATING PLAYLISTS

BACKGROUND OF THE INVENTION

1. Field of the Invention

The present invention relates to media systems and, more particularly, to media systems that support playlists.

2. Description of the Related Art

Media systems have permitted users to create playlists of audio tracks (i.e., songs) that are to be played. Typically, the media systems store a large library of audio tracks. Hence, the ability for a user to create their own playlists assists the user in playing those of the audio tracks from the library they prefer.

Conventionally, playlists have been created either by a drag-and-drop operation or by rules. A representative example of drag-and-drop playlist creation is the playlist creation of iTunes, version 1.0, from Apple Computer, Inc. of Cupertino, Calif. A representative example of a rules-based playlist creation is the playlist composer of SoundJam MP Plus published by Casady & Greene, Inc. of Salinas, Calif.

In the case of the drag-and-drop operation, the user selects one or more certain audio tracks from a list of audio tracks in a library. Then, the selected one or more tracks are dragged into a playlist. This drag-and-drop operation can be repeated until all the desired audio tracks have been dragged into the playlist. Later, such as after the audio tracks in the library are changed, the user can drag new audio tracks into or delete tracks from the playlist. Thus, the drag-and-drop operation requires user interaction and is particularly cumbersome for media systems that have a large library of audio tracks to choose from.

In the case of a playlist that is defined by rules, the playlist is created by a computing device selecting those of the audio tracks in the library that satisfy the rules. The user specifies the rules for the playlist. The rules are the criteria that are used to determine whether the audio tracks are to be included in the playlist. For example, a rule could include in the playlist all audio tracks listing "Pink Floyd" as artist. When the rules are processed by the computing device, the audio tracks satisfying the rules are placed in the playlist. Although the creation of the playlist is automated after the user specifies the appropriate rules, the playlist that is created is fixed. Unfortunately, since the audio tracks in libraries often change (e.g., new audio tracks added), the playlist that has been created soon becomes unreliable. For example, the playlist could easily not include certain of the subsequently added audio tracks in the library that satisfy the rules for the playlist. A user would be forced to either manually perform drag-and-drop operations with respect to the playlist or manually again specify rules and create a new playlist in order to have the playlist include all the audio tracks within the library that satisfy the rules for the playlist.

Thus, there is a need for improved techniques to maintain playlists within media systems.

SUMMARY OF THE INVENTION

Broadly speaking, the invention relates to automatic (or dynamic) updating (or maintaining) of playlists for a media system that stores and plays media content for a user of the media system. The automatic update to playlists can occur when additional media content is added to or removed from the media system. The automatic update to playlists can also occur when previously stored media content is otherwise altered.

The invention can be implemented in numerous ways including as a method, system, device, apparatus, and computer readable medium. Several embodiments of the invention are discussed below.

As a computer-implemented method for automatically updating a playlist on a media system, one embodiment of the invention includes at least the acts of: determining whether media content available to the media system has been altered; and automatically regenerating the playlist when it is determined that the media content available to the media play system has been altered.

As a computer-implemented method for updating a playlist on a media player, one embodiment of the invention includes at least the acts of: receiving playlist rules to be used to create the playlist; producing a playlist from a plurality of available media items and the playlist rules; subsequently determining whether the playlist should be reproduced due to changes with respect to the available media items; and rebuilding the playlist from the plurality of available media items and the playlist rules when it is determined that the playlist should be rebuilt.

As a computer readable medium including at least computer program code for automatically updating a list of media items maintained by a media system, one embodiment of the invention includes at least: computer program code for determining whether at least one media item available to the media system has been altered; and computer program code for regenerating the list of media items when it is determining determined that at least one media item available to the media system has been altered.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to automatic (or dynamic) updating (or maintaining) of playlists for a media system that stores and plays media content for a user of the media system. The automatic update to playlists can occur when additional media content is added to or removed from the media system. The automatic update to playlists can also occur when previously stored media content is otherwise altered.

Embodiments of the invention are discussed below with reference to FIGS. 1A-11B. However, those skilled in the art will readily appreciate that the detailed description given herein with respect to these figures is for explanatory purposes as the invention extends beyond these limited embodiments.

Figure 1A:
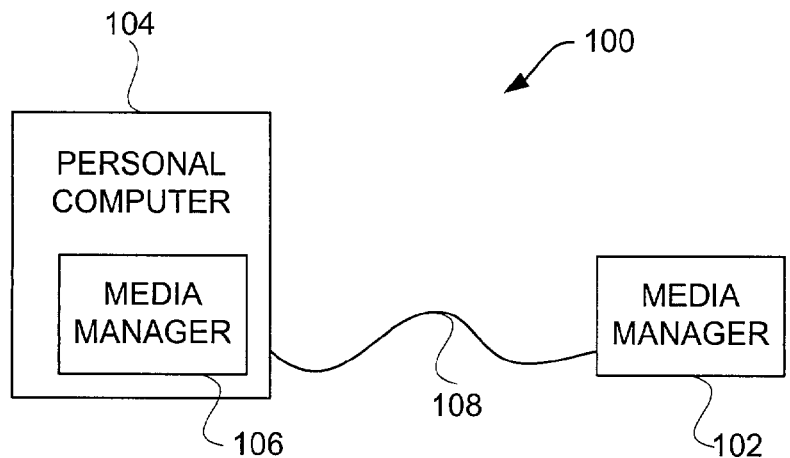
FIG. 1A is a block diagram of a media management system according to one embodiment of the invention.

FIG. 1A is a block diagram of a media management system 100 according to one embodiment of the invention. The media management system 100 includes a media player 102 and a personal computer (host computer) 104. The media player 102 is, for example, a portable, battery-operated device. In one embodiment, the media player 102 is an MP3 player. The personal computer 104 includes a media manager 106. The media manager 106 enables a user of the personal computer 104 to directly manage media content stored on the personal computer 104. The media manager 106 may also indirectly manage media content stored on the media player 102. A peripheral cable 108 couples the media player 102 to the personal computer 104. Typically, the peripheral cable 108 couples data ports provided on the media player 102 and the personal computer 104. In one example, the data ports can be FIREWIRE ports and the peripheral cable 108 can be a FIREWIRE cable. More generally, the peripheral cable 108 acts as a data link. Media items can be transferred from the media player 102 to the personal computer 104 over the peripheral cable 108, and vice-versa.

The media manager 106 facilitates browsing, adding, deleting, organizing, and other operations with respect to media content (e.g., numerous media items) on the personal computer 104. More particularly, the media manager 106 assists a user in organizing media items into one or more playlists. A playlist is a list of media items that are to be "played." Depending on the type of media involved, the manner in which a media item is "played" can vary. According to the invention, a playlist is able to be automatically updated subsequent to its initial creation. Those playlists that are automatically updated can be referred to as dynamic playlists. In other words, a dynamic playlist is a playlist that is to be automatically updated as appropriate when its underlying data source is altered. A non-dynamic playlist is a playlist that is fixed on creation (i.e., not updated) regardless of changes to its underlying data source. In either case, manual user actions can typically be used to alter the playlists.

According to one embodiment, a user can form playlists manually by a drag-and-drop operation or automatically from user-provided rules. In such an embodiment, the rules-based playlists can be automatically updated (i.e., dynamic playlists), whereas other playlists that are not rules-based cannot be automatically updated (i.e., non-dynamic playlists).

Additionally, the media manager 106 can also assist a user in adding and removing media content or playlists with respect to the media player 102. In other words, although the media manager 106 resides on the personal computer 104, at least certain management action taken with respect to the media manager 106 can cause the media content or playlists at the media player 102 to be similarly managed. For example, the media manager 106 can synchronize the media content and the playlists between the personal computer 104 and the media player 102.

The media management system 100 need not include the media player 102 as the media manager 106 can manage media content residing on the personal computer 104. Hence, the media player 102 and its peripheral cable 108 can be considered optional components of the media management system 100.

Nevertheless, in one embodiment, the media player is a portable computing device dedicated to processing media such as audio, video or images. For example, the media player 102 can be a music player (e.g., MP3 player), a game player, a video player, a video recorder, a camera, an image viewer, and the like. These devices are generally battery-operated and highly portable so as to allow a user to listen to music, play games or video, record video or take pictures wherever the user travels. In one implementation, the media player is a hand-held device that is sized for placement into a pocket or hand of the user. By being hand-held, the media player is relatively small and easily handled and utilized by its user. By being pocket-sized, the user does not have to directly carry the device and therefore the device can be taken almost anywhere the user travels (e.g., the user is not limited by carrying a large, bulky and often heavy device, as in a portable computer). Furthermore, the device may be operated by the user's hands, no reference surface such as a desktop is needed.

Figure 1B:
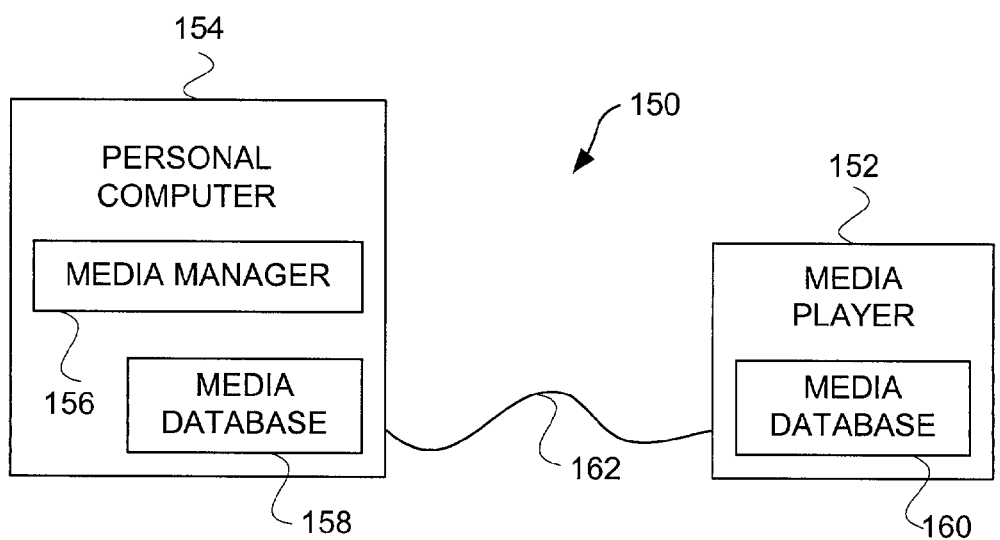
FIG. 1B is a block diagram of a media synchronization system according to one embodiment of the invention.

FIG. 1B is a block diagram of a media synchronization system 150 according to one embodiment of the invention. The media synchronization system 150 can, for example, represent one embodiment of the more general media management system 100 illustrated in FIG. 1A. The media synchronization system 150 includes a media player 152 and a personal computer 154. The personal computer 154 includes a media manager 156. The personal computer 154 further includes a media database 158. The media player 152 includes a media database 160. Typically, the media player 152 will also include a data storage device (e.g., disk drive) for storing media content, a cache memory for storing media content in-use, a screen display for displaying information to a user, and a processor (e.g., microprocessor) for controlling operation of the media player 152.

A peripheral cable 162 provides a data path (or data link) between the media player 152 and the personal computer 154. The peripheral cable 162 provides a peripheral bus that couples the media player 152 to the personal computer 154. The peripheral bus, for example, could be a FIREWIRE bus or a Universal Serial Bus (USB). A synchronization operation between the media content stored on the personal computer 154 and the media content stored on the media player 152 can be achieved in a sophisticated manner through comparison of media information stored in the respective media databases 158 and 160. When comparison of the media information from the respective databases 158 and 160 indicates that there is a particular media item resident on the personal computer 154 that is not resident on the media player 152, then the particular media item can be transmitted (downloaded) to the media player over the peripheral cable 162. On the other hand, when the comparison of the media information from the respective databases 158 and 160 indicates that a particular media item is resident on the media player 152 but is not resident on the personal computer 154, then the particular media item can be either removed (deleted) from the media player 152 or transmitted (e.g., uploaded) over the peripheral cable 162 to the personal computer 154. Hence, by providing the media player 152 with the media database 160, more sophisticated synchronization and management of media content is enabled.

The media database 160 also allows the media player 152 to present a user interface to the user that is more sophisticated than conventional approaches. Such a user interface can be presented on the screen display of the media player 152. The user interface can, for example, allow the user of the media player 152 to browse, sort, search, play, etc. the media content resident on the media player 152. The user interface can also allow the user of the media player 152 to download (add) or delete (remove) media items from the media player 152. The media manager 156 also has a user interface that allows a user to browse, sort, search, play, make playlists, burn Compact Discs (CDs), etc. the media content resident on the personal computer 154. The user interface can also allow the user of the personal computer 154 to download (add) or delete (remove) media items from the personal computer 154. In one embodiment, the media manager 156 and its associated user interface are provided by iTunes, version 2.0, from Apple Computer, Inc. of Cupertino, Calif.

Figure 2:
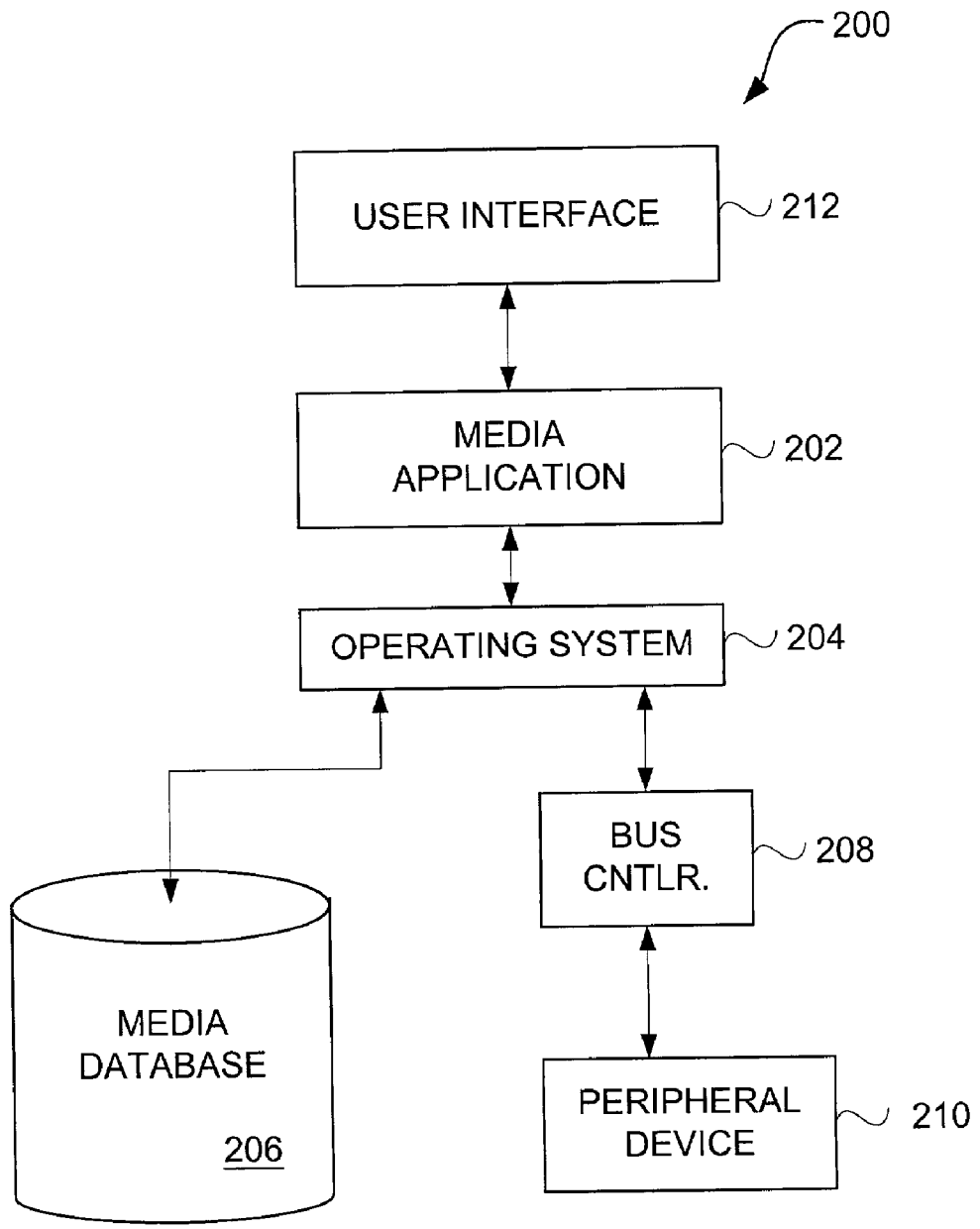
FIG. 2 is a block diagram of program architecture according to one embodiment of the invention.

FIG. 2 is a block diagram of program architecture 200 according to one embodiment of the invention. The program architecture 200 is used to update playlists (i.e., dynamic playlists) in accordance with one embodiment of the invention. The program architecture 200 is centered about a media application 202. The media application 202 permits users to store and play media items, as well as to create and utilize playlists composed of one or more particular media items. The media application 202 couples to an operating system 204. The operating system 204 in turn couples to a media database 206 that stores media items to be utilized by the media application 202. The media database 206 also stores playlists that have been created by the media application 202. The media application 202 also operates to update one or more playlists that are stored within the media database 206. The program architecture 200 also includes a bus controller 208 that couples a peripheral device 210 to the operating system 204. Here, the peripheral device 210 can be utilized to provide another data source for the media application 202.

Figure 3A:
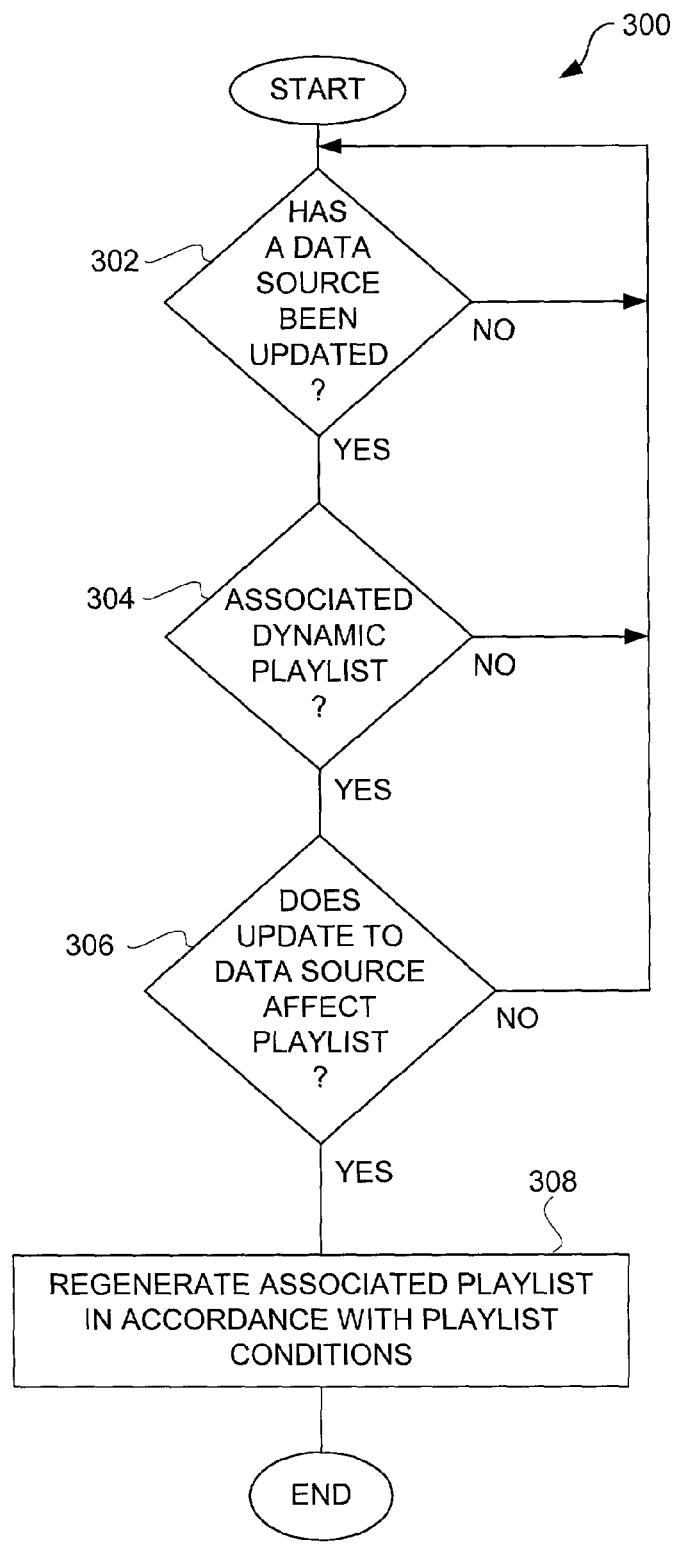
FIG. 3A is a flow diagram of update playlist processing according to one embodiment of the invention.

FIG. 3A is a flow diagram of update playlist processing 300 according to one embodiment of the invention. The update playlist processing 300 can be performed on a media play system offering playlist support. For example, the media play system can be a computing device, such as a personal computer.

The update playlist processing 300 begins with a decision 302 that determines whether a data source has been updated. Here, a data source pertains to a source of media content, namely, media items. Examples of data sources are a compact disc (CD), a portable media player, a remote server through the Internet, or a local disk drive. When the decision 302 determines that a data source has not been updated, then no modifications, additions or deletions to the media content or media items associated with the media play system have been made, thus the update playlist processing 300 returns to repeat the decision 302.

On the other hand, once the decision 302 determines that a data source has been updated, then a decision 304 determines whether there is a dynamic playlist is associated with the data source. A dynamic playlist is a playlist that is to be updated as appropriate when its underlying data source is altered. When the decision 304 determines that there is no dynamic playlist associated with the data source, then the update playlist processing 300 returns to repeat the decision 302 and subsequent blocks. In other words, when there is no dynamic playlist associated with the data source, then the balance of the update playlist processing 300 need not be performed.

Alternatively, when the decision 304 determines that there is a dynamic playlist associated with the data source, then a decision 306 determines whether the update to the data source affects the dynamic playlist. When the decision 306 determines that the update to the data source does not affect the dynamic playlist, then the update playlist processing 300 returns to repeat the decision 302 and subsequent blocks. Here, the playlist is dynamic and associated with the data source, but since the alternations to the data source do not impact the dynamic playlist, the balance of the update playlist processing 300 need not be performed.

When the decision 306 determines that the update to the data source does affect the dynamic playlist, then the dynamic playlist is regenerated 308 in accordance with playlist conditions. The playlist conditions specify rules or criteria utilized in determining the media items of the data source that are to be included in the dynamic playlist. The playlist conditions are thus associated with a particular dynamic playlist. After the dynamic playlist has been regenerated 308, the update playlist processing 300 is complete and ends with the dynamic playlist having been regenerated.

The decision 306, if implemented, is used to improve performance efficiency. Namely, the decision 306 allows the regeneration 308 of the dynamic playlist to be avoided when the updates to the data source would not cause the dynamic playlist to change if it were regenerated. Hence, if desired, the decision 306 can be approximated or even eliminated in other embodiments. Additionally, if the dynamic playlist were being displayed on a display screen associated with the media player when the regeneration 308 was performed, then the displayed dynamic playlist could be re-drawn so as to reflect the regenerated version of the dynamic playlist.

Figure 3B:
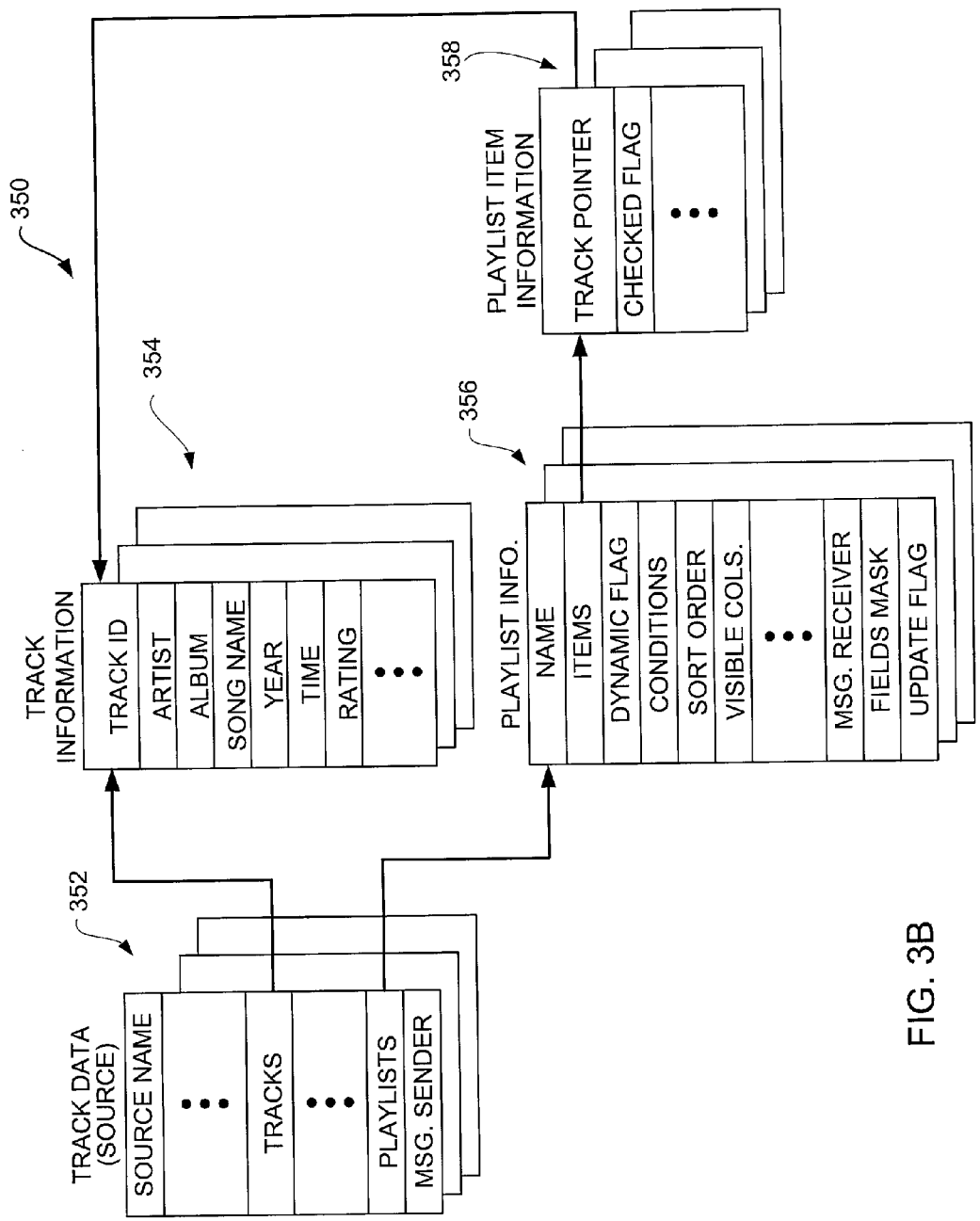
FIG. 3B is a diagram of a media database arrangement in accordance with one embodiment of the invention.

FIG. 3B is a diagram of a media database arrangement 350 in accordance with one embodiment of the invention. The media database arrangement 350 is, for example, suitable for use with the media database 206 illustrated in FIG. 2.

The media database arrangement 350 stores track data 352 for each data source provided by a media system (e.g., media play system). The track data for a particular data source can include various descriptive data such as source name, tracks and playlists. The track data 352 can also include a message sender that serves to distribute messages to message receivers when modifications, additions or deletions have been made with respect to the track data 352. The tracks of the track data 352 point to track information 354. The track information 354 contains various fields that provide descriptive information about particular tracks. For example, for a particular track, the track information 354 can include a track identifier (ID), artist, album, song name, year, time, rating, etc. The playlists within the track data 352 can point to those playlists that are associated with the track data 352. More particularly, the playlists within track data 352 can point to playlist information 356 pertaining to particular playlists. The playlist information 356 includes various descriptive information for each playlist. As an example, the playlist information 356 can include name, items, dynamic flag, conditions, sort order, visible columns, etc. The dynamic flag indicates whether or not the associated playlist is to be dynamic.

Still further, the playlist information 356 can include a message receiver (that receives messages from the message sender), a fields mask, and an update flag. The items within the playlist information 356 point to playlist item information 358 for particular items within a playlist. The playlist item information 358 includes at least a track pointer to a particular track in the track information 354. Hence, the track pointer within the playlist item information 358 provides the pointer to the track information 354 such that the media content (file) that is to be associated with a particular item in a playlist is able to be identified and retrieved. The playlist item information 358 can also include one or more playlist-specific fields to provide specific information to be associated with particular items within a playlist. As an example, the playlist item information 358 shown in FIG. 3 includes a checked flag that is used in one embodiment of the invention to allow a user to check or uncheck particular items within a playlist such that they are enabled or disabled from being used when the media content of the playlist is played.

Figure 4:
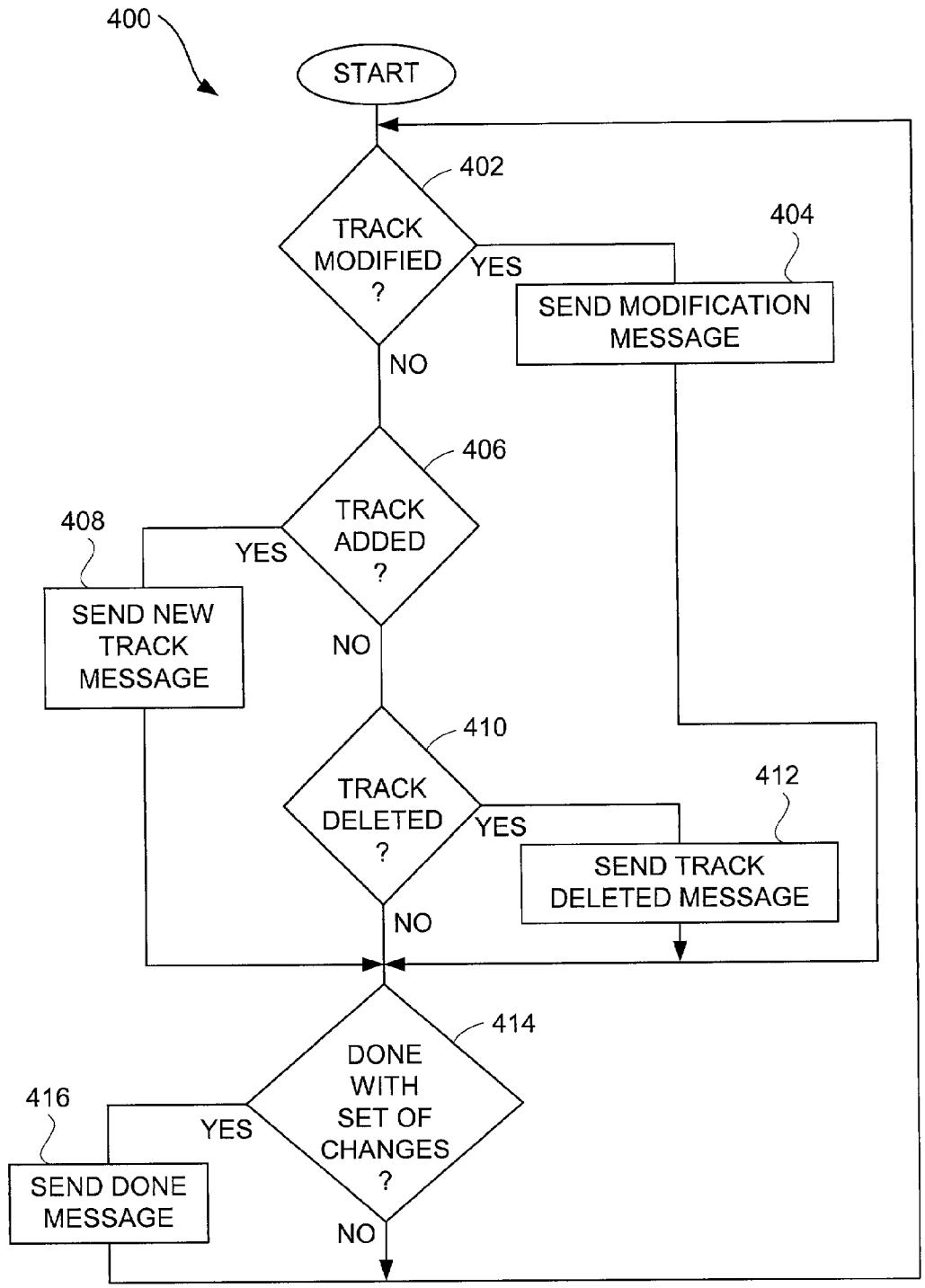
FIG. 4 is a flow diagram of inter-process messaging according to one embodiment of the invention.
Figure 5A:
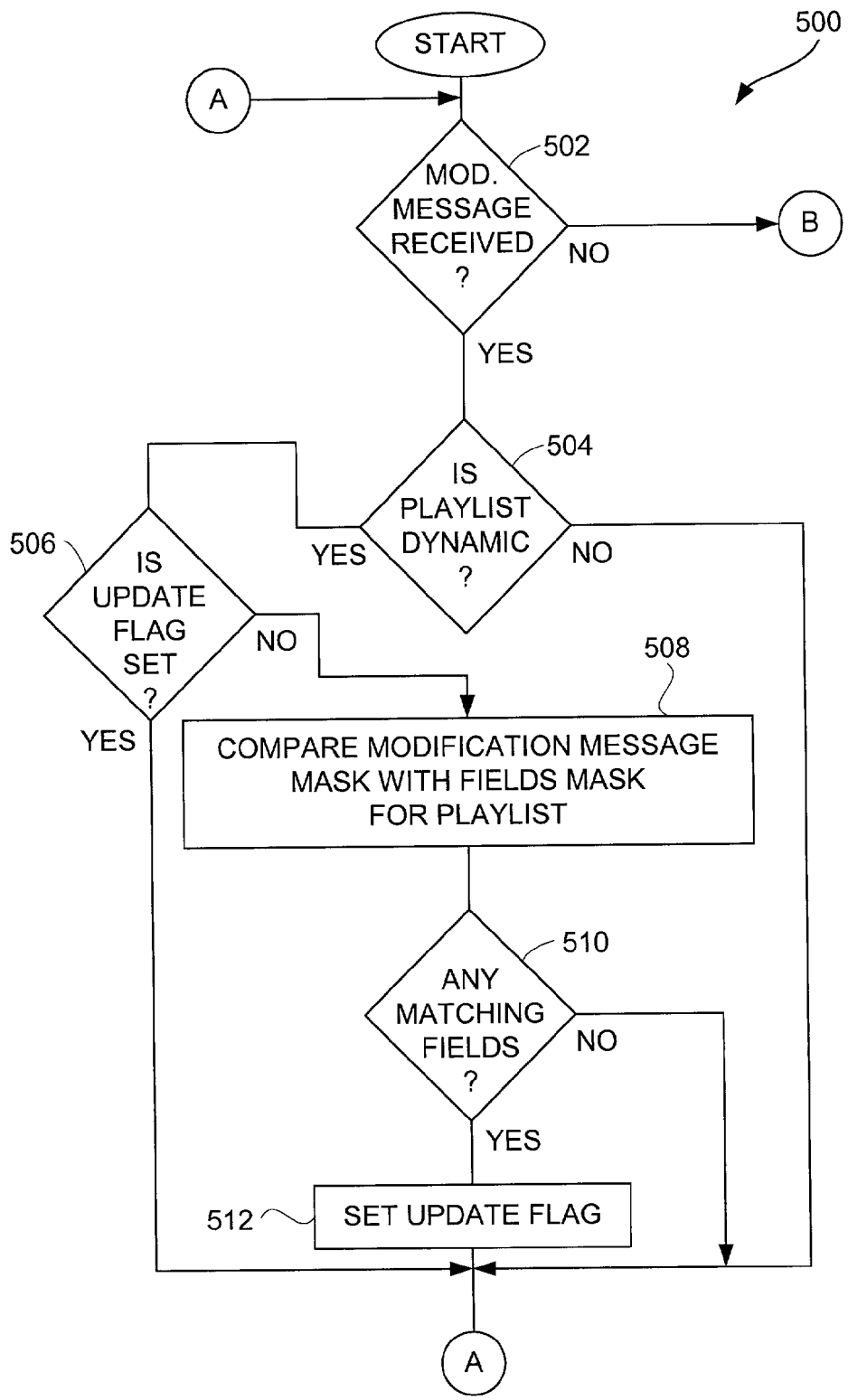
FIGS. 5A-5D are flow diagrams of message update processing according to one embodiment of the invention.
Figure 5B:
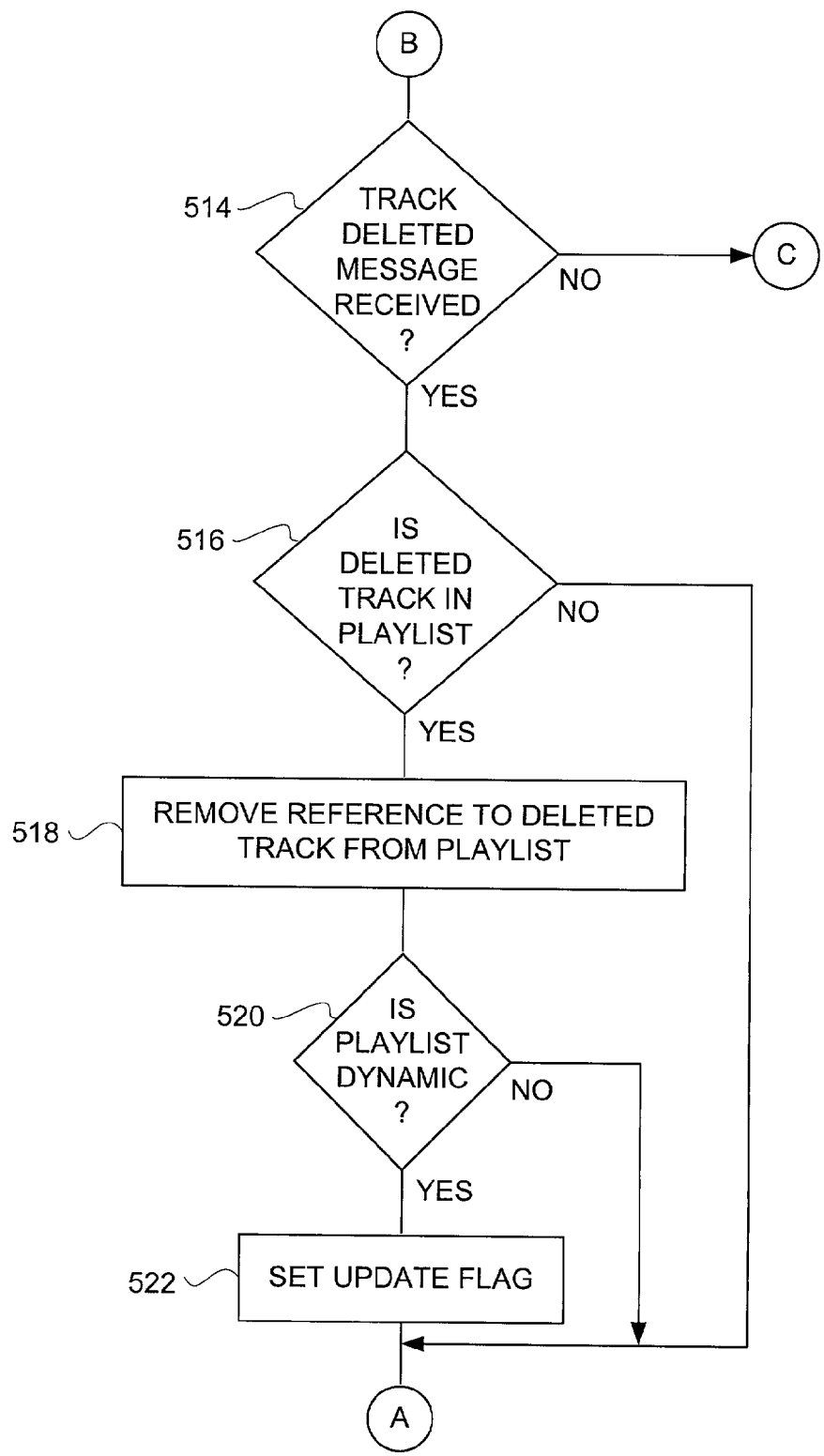
Figure 5C:
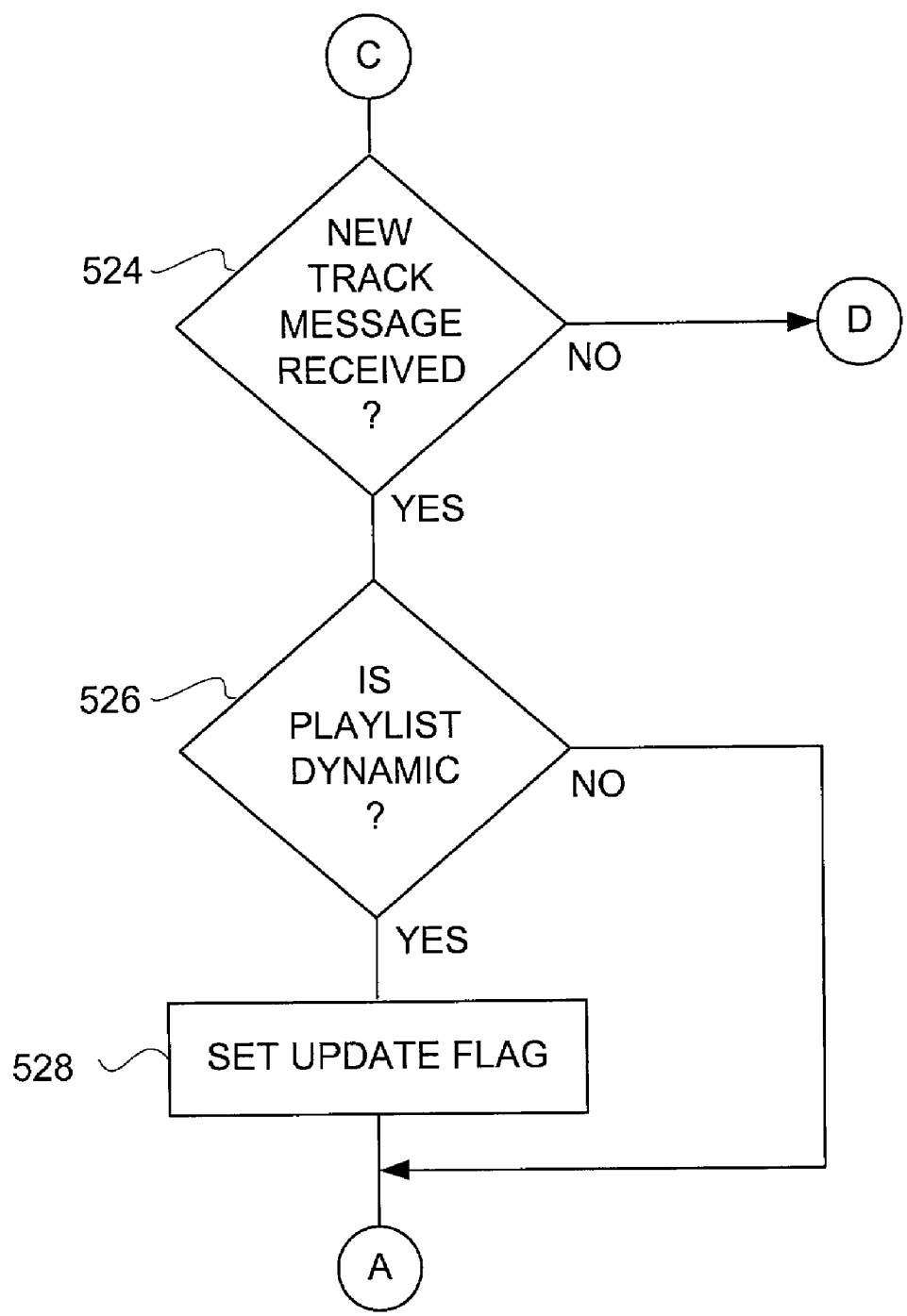
Figure 5D:
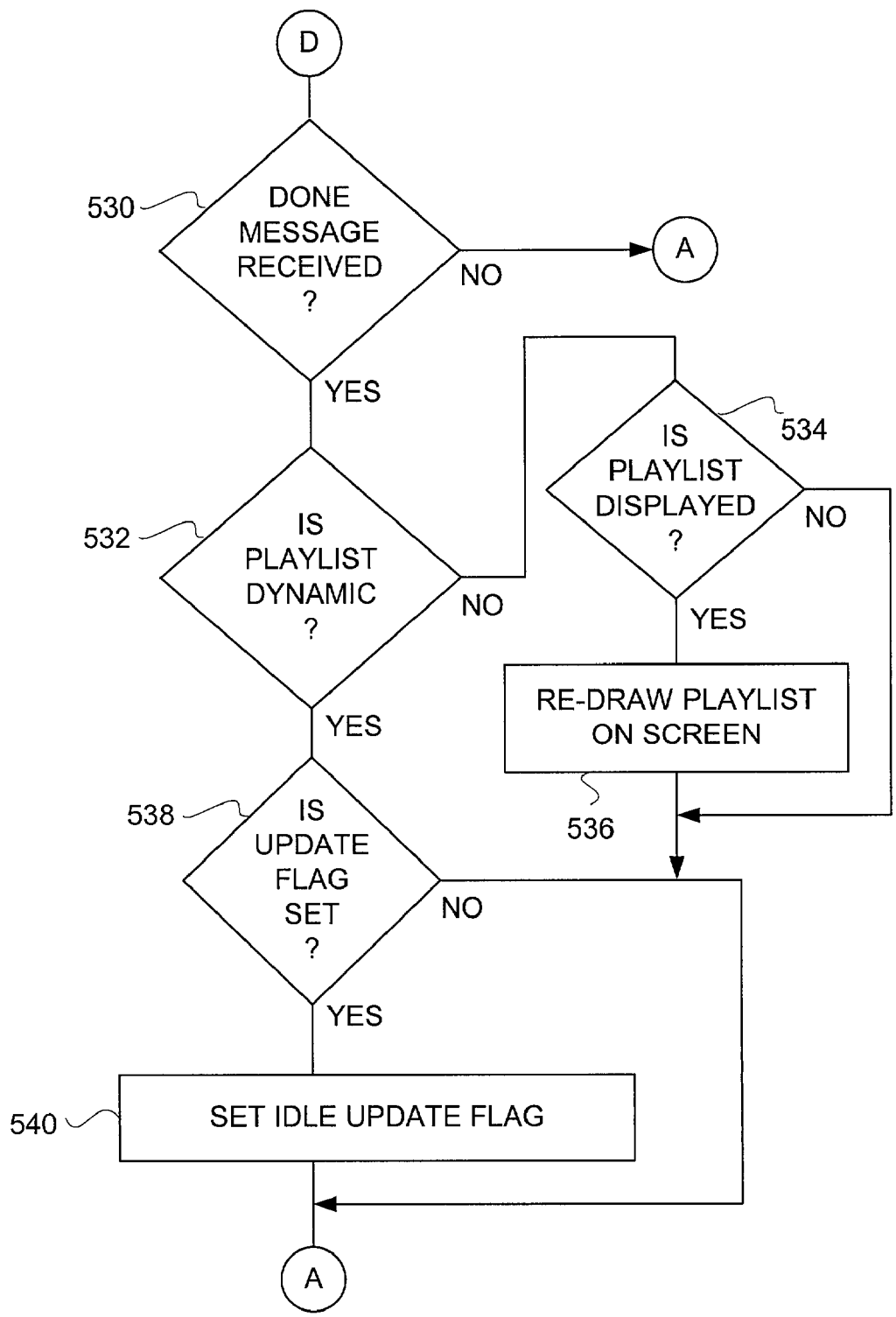

FIG. 4 is a flow diagram of inter-process messaging 400 according to one embodiment of the invention. The inter-process messaging 400 is, for example, performed by a message sender, such as the message sender provided within the track data 352 illustrated in FIG. 3B.

The inter-process messaging 400 begins with a decision 402 that determines whether a track has been modified. When the decision 402 determines that a track has been modified, then a modification message is sent 404. On the other hand, when the decision 402 determines that a track has not been modified, then a decision 406 determines whether a track has been added. When the decision 406 determines that a track has been added, then a new track message is sent 408. Alternatively, when the decision 406 determines that a track has not been added, then a decision 410 determines whether a track has been deleted. When the decision 410 determines that a track has been deleted, then a track deleted message is sent 412. Following the operations 404, 408, 410 (when a track is not being deleted), and 412 (when a track is being deleted), a decision 414 determines whether the inter-process messaging 400 is done with a set of changes. For example, when a set of changes are being made (e.g., a set of tracks being modified, added or deleted), the changes can be processed as a set for more efficient processing. Hence, the decision 414 determines whether a set of changes has been completed. When the decision 414 determines that the inter-process messaging is done with a set of changes, then a done message is sent 416. Following the operation 416, the inter-process messaging 400 returns to repeat the decision 402 and subsequent blocks. Alternatively, when the decision 414 determines that the inter-process messaging 400 is not done with a set of changes, then the inter-process messaging 400 returns directly to repeat the decision 402 and subsequent blocks (thereby bypassing the operation 416).

FIGS. 5A-5D are flow diagrams of message update processing 500 according to one embodiment of the invention. The message update processing 500 processes messages being received, such as the modification message, the new track message, and the track deleted message discussed above with respect to FIG. 4.

The message update processing 500 begins with a decision 502 that determines whether a modification message has been received. When the decision 502 determines that a modification message has been received, then a decision 504 determines whether the playlist being processed is dynamic. When the decision 504 determines that the playlist is dynamic, then a decision 506 determines whether an update flag is set. When the decision 506 determines that an update flag is not set, then a modification message mask is compared 508 with a fields mask for the playlist. The fields mask, for example, can be provided within the playlist information for the playlist. The modification message mask can be provided with the modification message that has been received. The comparison indicates whether any one or more fields of the tracks being modified are fields that are utilized by the playlist.

A decision 510 then determines whether there are any matching fields between the modification message mask and the fields mask. When the decision 510 determines that there are matching fields, then an update flag is set 512. The update flag is a flag that indicates that the dynamic playlist is affected by the modification associated with the modification message, and thus the dynamic playlist should be updated. Alternatively, when the decision 510 determines that there are no matching fields, then the dynamic playlist need not be updated and thus the operation 512 is bypassed. Still further, when the decision 504 determines that the playlist is not dynamic or when the decision 506 determines that the update flag is already set, then the message update processing 500 returns to repeat the decision 502 and subsequent operations. Following the operation 512, the message update processing 500 also returns to repeat the decision 502 and subsequent operations.

On the other hand, when the decision 502 determines that a modification message has not been received, then a decision 514 determines whether a track deleted message has been received. When the decision 514 determines that a track deleted message has been received, then a decision 516 determines whether the deleted track is in the playlist being processed. When the decision 516 determines that the deleted track is in the playlist, then the reference (e.g., pointer) to the deleted track is removed 518 from the playlist, thereby removing the data structure which associated the deleted track from the playlist. Next, a decision 520 determines whether the playlist is dynamic. When the decision 520 determines that the playlist is dynamic, an update flag is set 522. Alternatively, when the decision 520 determines that the playlist is not dynamic, the operation 522 is bypassed. On the other hand, when the decision 516 determines that the deleted track is not in the playlist, then the operations 518-522 are bypassed. Hence, following the operation 522, or its being bypassed, the message update processing 500 returns to repeat the decision 502 and subsequent operations.

Still further, when the decision 514 determines that a track deleted message has not been received, then a decision 524 determines whether a new track message has been received. When the decision 524 determines that a new track message has been received, then a decision 526 determines whether the playlist being processed is dynamic. When the decision 526 determines that the playlist is dynamic, then an update flag is set 528. Alternatively, when the decision 526 determines that the playlist is not dynamic, then the operation 528 is bypassed. Following the operation 528 or its being bypassed, the message update processing 500 returns to the beginning of the message update processing 500 to repeat the decision 502 and subsequent operations.

Finally, when the decision 524 determines that a new track message has not been received, then a decision 530 determines whether a done message has been received. When the decision 530 determines that a done message has been received, then a decision 532 determines whether the playlist being processed is a dynamic playlist. When the decision 532 determines that the playlist is not dynamic, then a decision 534 determines whether the playlist is being displayed. When the decision 534 determines that the playlist is being displayed, then the playlist is re-drawn 536 on the screen. Alternatively, when the decision 534 determines that the playlist is not being displayed, the operation 536 is bypassed.

On the other hand, when the decision 532 determines that the playlist is dynamic, then a decision 538 determines whether the update flag has been set. When the decision 538 determines that the update flag is set, then an idle update flag is set 540. Here, the idle update flag is a flag to indicate that during idle processing, the dynamic playlist should be updated. By performing the updating to dynamic playlist in the idle processing, the somewhat intensive computations/processes being performed are able to be done in a background mode without impacting the user's perceived performance of the computing device (e.g., media system). Alternatively, when the decision 538 determines that the update flag is not set, or following the operation 536 or the decision 534 when the playlist is not dynamic, the message update processing 500 returns to repeat the decision 502 and subsequent operations.

Figure 6:
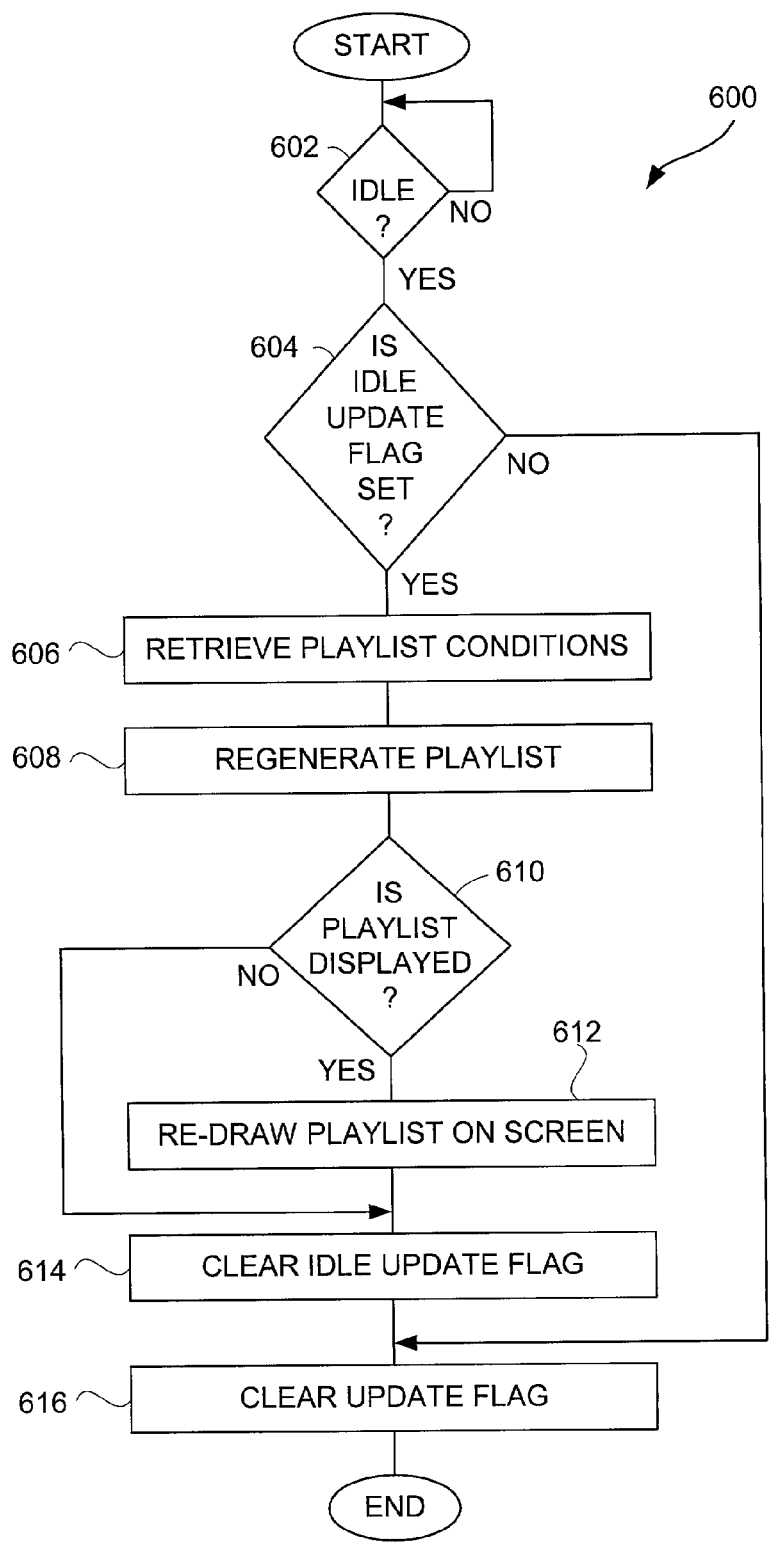
FIG. 6 is a flow diagram of idle update processing according to one embodiment of the invention.

FIG. 6 is a flow diagram of idle update processing 600 according to one embodiment of the invention. The idle update processing 600 begins with a decision 602 that determines whether the computing device is in an idle state. When the decision 602 determines that the computing device is not in an idle state, then the idle update processing 600 awaits such a state. In other words, the idle update processing 600 is invoked when the computing device reaches an idle state.

Once the computing device has reached an idle state, a decision 604 determines if the idle update flag is set. When the decision 604 determines that the idle update flag is set, playlist conditions are retrieved 606. The playlist conditions being retrieved 606 are associated with a particular playlist that is being processed. After the playlist conditions have been retrieved 606, the playlist is regenerated 608. Next, a decision 610 determines if the playlist is being displayed. When the decision 610 determines that the playlist is being displayed, the playlist is re-drawn 612 on the screen of the computing device. Alternatively, when the decision 610 determines that the playlist is not being displayed, the operation 612 is bypassed. Following the operation 612, or its being bypassed, the idle update flag is cleared 614. Following the operation 614, as well as following the decision 604 when the idle update flag is not set, the update flag is cleared 616. After the update flag has been cleared 616, the idle update processing 600 is complete and ends.

Figure 7A:
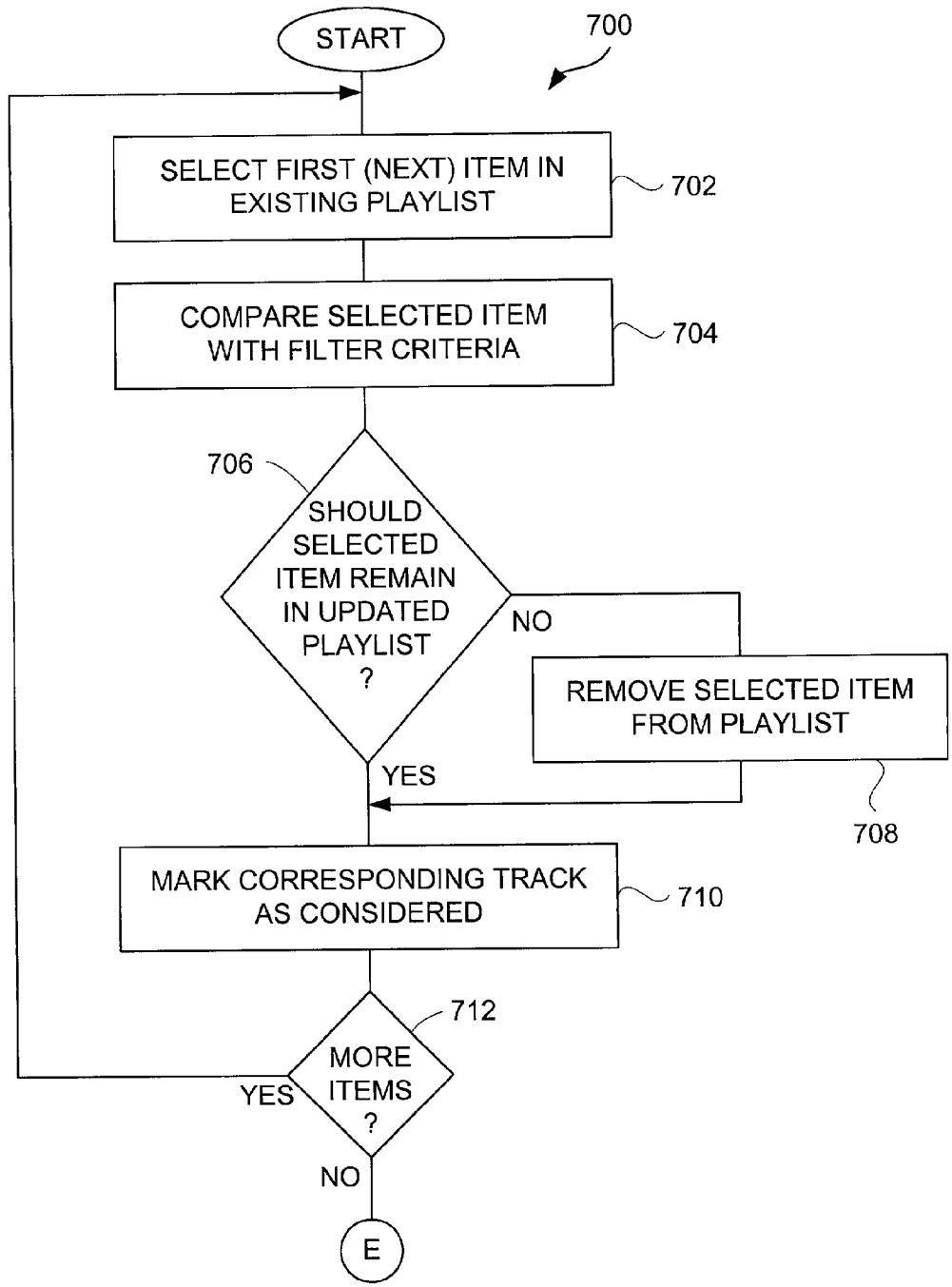
FIGS. 7A-7C are flow diagrams of regenerate playlist processing according to one embodiment of the invention.
Figure 7B:
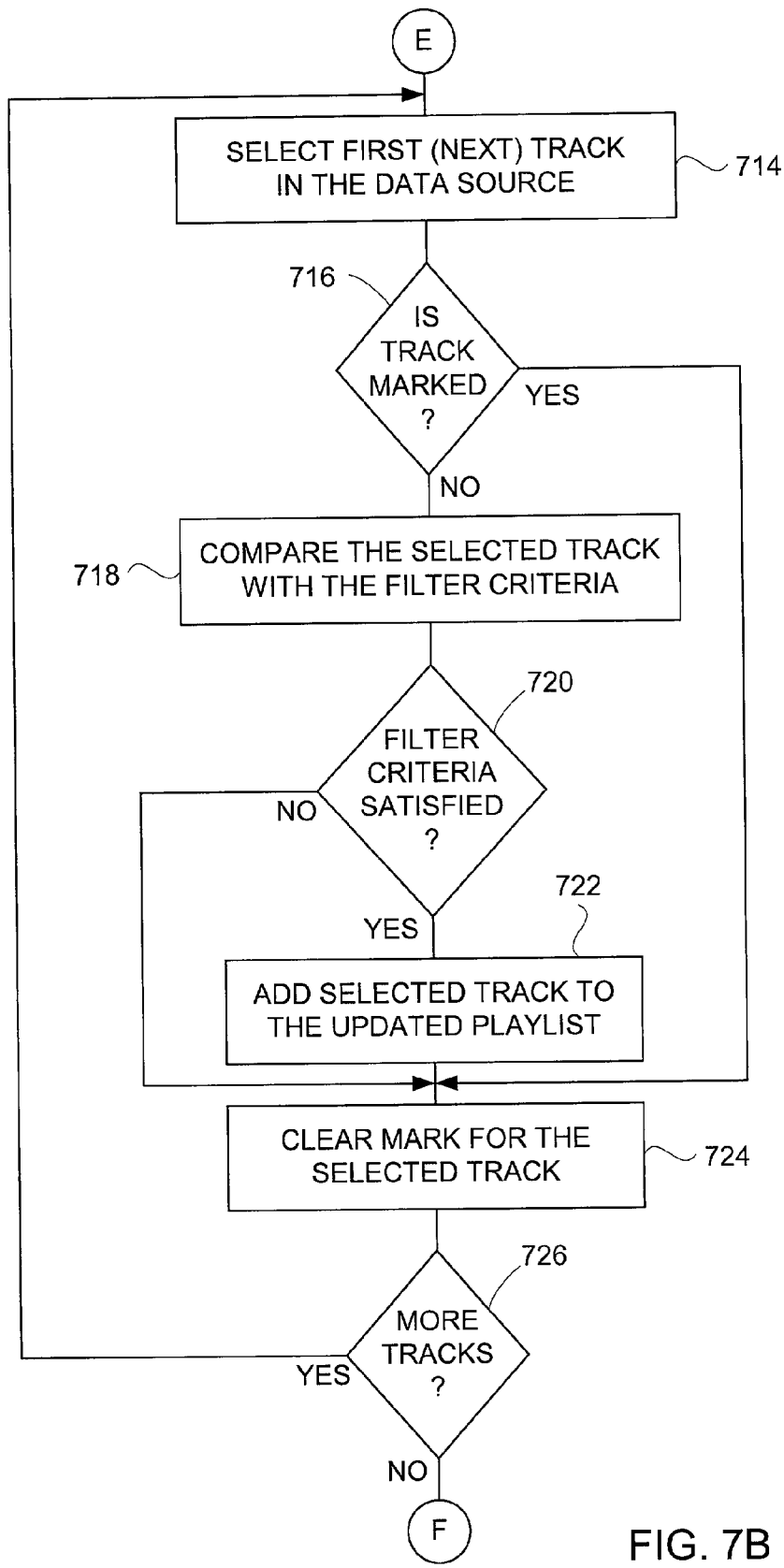
Figure 7C:
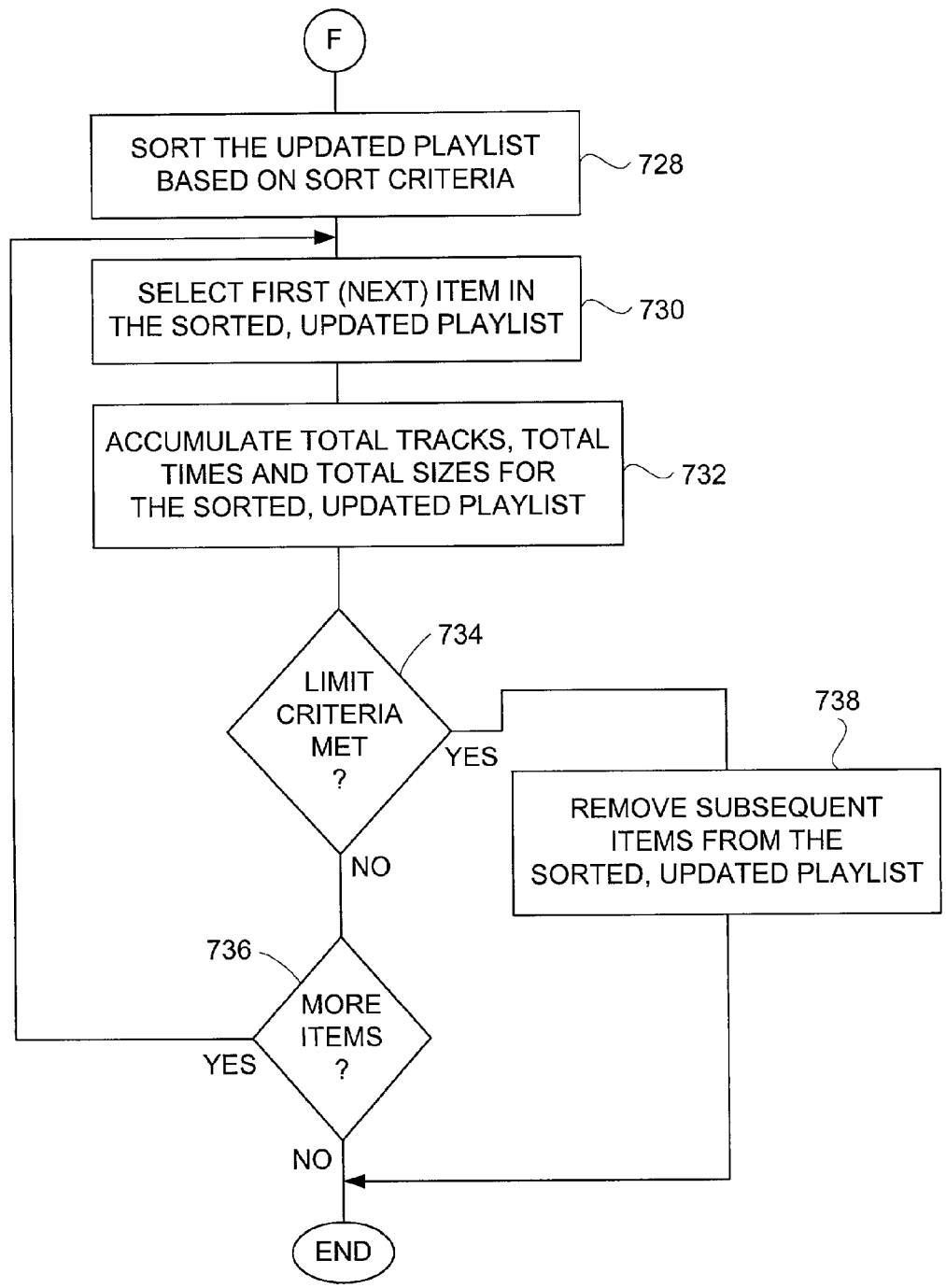

FIGS. 7A-7C are flow diagrams of regenerate playlist processing 700 according to one embodiment of the invention. The regenerate playlist processing 700 is, for example, processing performed by the regeneration 608 of the playlist in FIG. 6 or the regeneration 308 of the playlist illustrated in FIG. 3A.

The regenerate playlist processing 700 begins by selecting 702 a first item in the existing playlist that is being regenerated. Next, the selected item in the existing playlist is compared 704 with filter criteria. The filter criteria is a part of the playlist conditions for the existing playlist. Next, a decision 706 determines whether the selected item should remain in the updated playlist. When the decision 706 determines that the selected item should not remain in the updated playlist, then the selected item is removed 708 from the playlist. On the other hand, when the decision 706 determines that the selected item should remain in the playlist, then the corresponding track to the selected item is marked 710 as having been considered. Next, a decision 712 determines whether there are more items in the existing playlist to be processed. When the decision 712 determines that there are more items in the existing playlist to be considered, the regenerate playlist processing 700 returns to repeat the operation 702 so that a next item in the existing playlist can be selected.

Alternatively, when the decision 712 determines that there are no more items to be processed, additional processing is performed with respect to the data source associated with the playlist. More particularly, a first track in the data source is selected 714. Then, a decision 716 determines whether the selected track is marked. When the decision 716 determines that the selected track is not marked, then the selected track is compared 718 with the filter criteria. A decision 720 then determines whether the filter criteria is satisfied. When the decision 720 determines that the filter criteria is satisfied, the selected track is added 722 to the updated playlist. When the decision 720 determines that the filter criteria is not satisfied, then the operation 722 is bypassed so that the selected track is not added to the updated playlist. Further, when the decision 716 determines that the selected track is marked, then the operations 718-722 are bypassed because the particular track has already been processed and thus already either exists in the updated playlist or has been removed therefrom.

Next, the mark for the selected track is cleared 724. Here, the mark may not have previously been set, but nevertheless the mark can be cleared 724 or this operation could be bypassed. A decision 726 then determines whether there are more tracks in the data source to be processed. When the decision 726 determines that there are more tracks in the data source to be processed, the regenerate playlist processing 700 returns to repeat the operation 714 and subsequent operations.

On the other hand, when the decision 726 determines that there are no more tracks to be processed, the updated playlist is sorted 728 based on the sort criteria, which is another part of the playlist conditions. After the updated playlist has been sorted 728, a first item in the sorted, updated playlist is selected 730. Then, one or more of total tracks, total times and total sizes for the items in the sorted, updated playlist are accumulated 732 as they are processed. A decision 734 then determines whether limit criteria has been met, which are also provided by the playlist conditions. In one embodiment, the limit criteria can include the sort criteria. When the decision 734 determines that the limit criteria has not been met, then a decision 736 determines whether there are more items in the sorted, updated playlist to be processed. When the decision 736 determines that there are more items in the sorted, updated playlist to be processed, the regenerate playlist processing 700 returns to repeat the operation 730 and subsequent operations so that a next item can be selected and thereafter processed.

Alternatively, when the decision 734 determines that the limit criteria has been met, then all subsequent items are removed 738 from the sorted, updated playlist. Here, the balance of the sorted, updated playlist is removed therefrom as the limit criteria for the playlist has been met. Following the operation 738 or following the decision 736 when there are no more items to be processed, the regenerate playlist processing 700 is complete and ends.

As noted above, the playlist conditions can provide filter criteria, sort criteria and limit criteria. These criteria can be associated with the media information or track information for the media items. In one embodiment, the filter criteria might require a field of the track information to include or not include a particular alphanumeric string (i.e., string comparison). In another embodiment, the filter criteria might require a field of the track information include a numeric value less than, equal to, or greater than a particular numeric value (i.e., numeric comparison). In one embodiment, the sort criteria might be random, alphabetical, most recently played, rating, etc. In one embodiment, the limit criteria can be a numerical limit imposed on the length of the playlist. Such a limit can be with respect to a field of the track information. For example, the limit criteria could require that the playlist be limited to twenty-five (25) media items (e.g., tracks or songs) or two (2) hours of media play time.

Figure 8:
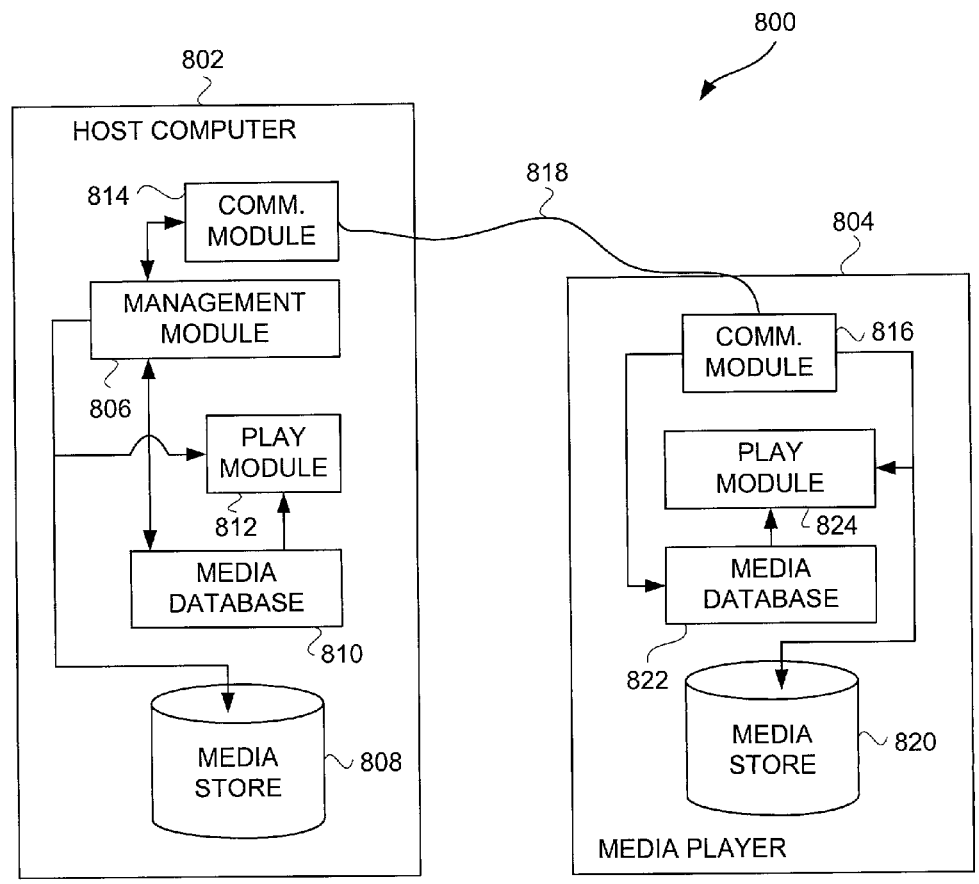
FIG. 8 is a block diagram of a media management system according to another embodiment of the invention.

FIG. 8 is a block diagram of a media management system 800 according to another embodiment of the invention. The media management system 800 includes a host computer 802 and a media player 804. The host computer 802 is typically a personal computer. The host computer, among other conventional components, includes a management module 806 which is a software module. The management module 806 provides for centralized management of media items and playlists on the host computer 802. The management module 806 may also indirectly provide centralized management of media items and playlists on the media player 804. More particularly, the management module 806 manages those media items stored in a media store 808 associated with the host computer 802. The management module 806 also interacts with a media database 810 to store media information and playlists associated with the media items stored in the media store 808. These playlists can be dynamic or non-dynamic.

The media information pertains to characteristics or attributes of the media items (and thus can be considered part of the media content). For example, in the case of audio or audiovisual media, the media information can include one or more of: title, album, track number, artist, composer and genre. The media information can also include year, duration (time) and rating. These types of media information are specific to particular media items. In addition, the media information can pertain to quality characteristics of the media items. Examples of quality characteristics of media items can include one or more of: bit rate, sample rate, equalization setting, and volume adjustment.

The playlists are lists of particular media items. The particular media items for the playlists can be selected automatically using rules (e.g., playlist conditions) or can be manually selected through user interaction with a graphical user interface. The playlists that have their media items selected by rules can be automatically updated (i.e., dynamic) when appropriate so as to maintain its compliance with the rules when the media items available to the host computer 802 change.

Still further, the host computer 802 includes a play module 812. The play module 812 is a software module that can be utilized to play certain media items stored in the media store 808. The play module 812 can also display (on a display screen) or otherwise utilize media information from the media database 810. Typically, the media information of interest corresponds to the media items to be played by the play module 812.

The host computer 802 can also include a communication module 814 that couples to a corresponding communication module 816 within the media player 804. A connection or link 818 removeably couples the communication modules 814 and 816. In one embodiment, the connection or link 818 is a data bus, such as a FIREWIRE bus or USB bus, which is well known in the art.

The media player 804 can also include a media store 820 that stores media items within the media player 804. The media items being stored to the media store 820 are typically received over the connection or link 818 from the host computer 802. More particularly, the management module 806 sends all or certain of those media items residing on the media store 808 over the connection or link 818 to the media store 820 within the media player 804. Additionally, the corresponding media information for the media items that is delivered to the media player 804 from the host computer 802 can be stored in a media database 822. In this regard, certain media information from the media database 810 within the host computer 802 can be sent to the media database 822 within the media player 804 over the connection or link 818.

Still further, playlists identifying certain of the media items can also be sent by the management module 806 over the connection or link 818 to the media store 820 or the media database 822 within the media player 804. In one embodiment, the media player 804 has limited or no capability to manage playlists on the media player 804. However, the management module 806 within the host computer 802 through management of the playlists residing on the host computer can indirectly manage the playlists residing on the media player 804. In this regard, additions, deletions or changes to playlists can be performed on the host computer 802 and then be carried over to the media player 804 when delivered thereto.

Furthermore, the media player 804 includes a play module 824 that couples to the media store 820 and the media database 822. The play module 824 is a software module that can be utilized to play certain media items stored in the media store 820. The play module 824 can also display (on a display screen) or otherwise utilize media information from the media database 822. Typically, the media information of interest corresponds to the media items to be played by the play module 824.

Hence, in one embodiment, the media player 804 has limited or no capability to manage media items on the media player 804. However, the management module 806 within the host computer 802 can indirectly manage the media items and playlists residing on the media player 804. For example, to "add" a media item to the media player 804, the management module 806 serves to identify the media item to be added to the media player 804 from the media store 808 and then causes the identified media item to be delivered to the media player 804. As another example, to "delete" a media item from the media player 804, the management module 806 serves to identify the media item to be deleted from the media store 808 and then causes the identified media item to be deleted from the media player 804. As still another example, if changes (i.e., alterations) to characteristics of a media item were made at the host computer 802 using the management module 806, then such characteristics can also be carried over to the corresponding media item on the media player 804. In one implementation, the additions, deletions and/or changes occur in a batch-like process during synchronization of the media items on the media player 804 with the media items on the host computer 802.

Figure 9:
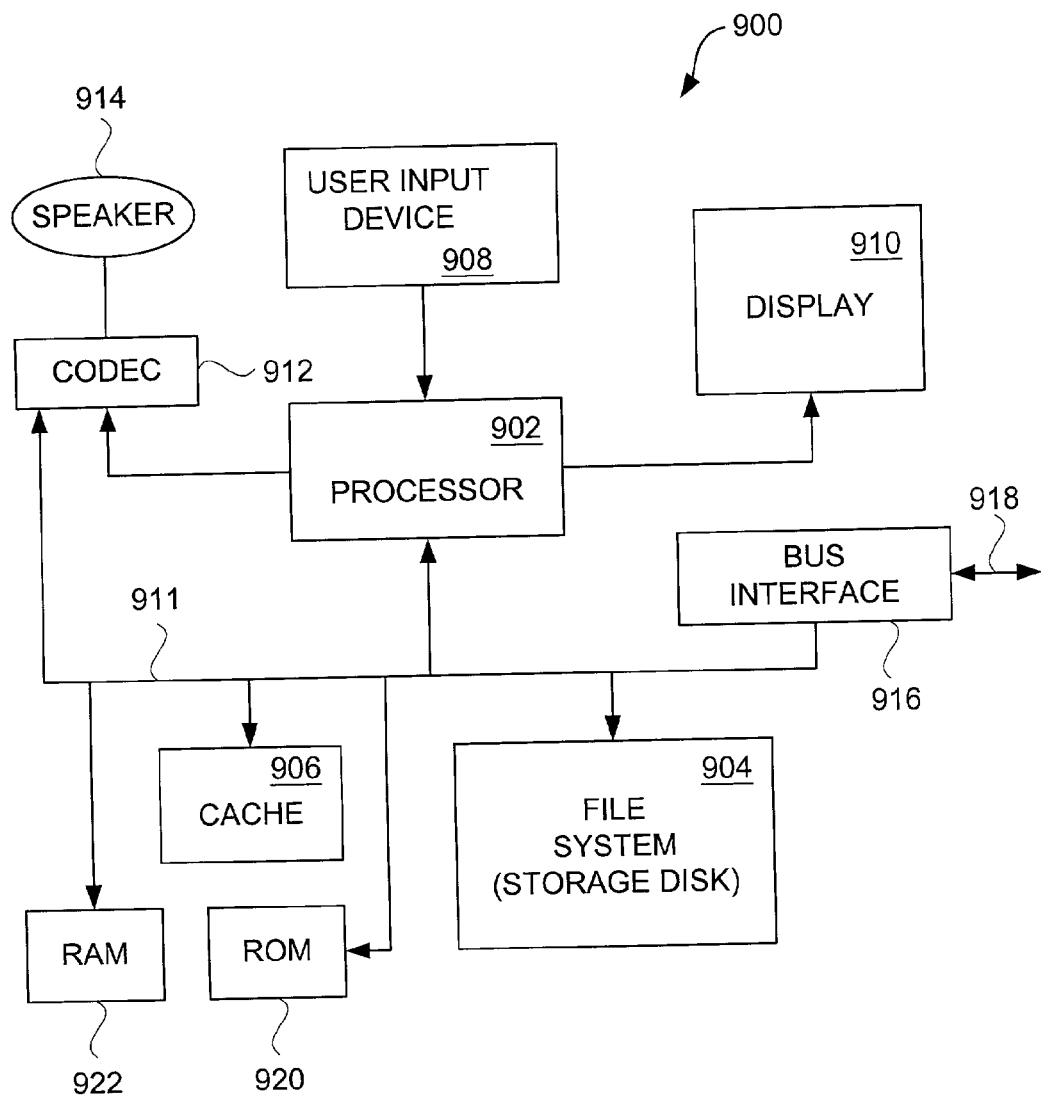
FIG. 9 is a block diagram of a media player according to one embodiment of the invention.

FIG. 9 is a block diagram of a media player 900 according to one embodiment of the invention. The media player 900 includes a processor 902 that pertains to a microprocessor or controller for controlling the overall operation of the media player 900. The media player 900 stores media data pertaining to media items in a file system 904 and a cache 906. The file system 904 is typically a storage disk or a plurality of disks. The file system 904 typically provides high capacity storage capabilities for the media player 900. However, since the access time to the file system 904 is relatively slow, the media player 900 can also include a cache 906. The cache 906 is, for example, Random-Access Memory (RAM) provided by semiconductor memory. The relative access time to the cache 906 is substantially shorter than for the file system 904. However, the cache 906 does not have the large storage capacity of the file system 904. Further, the file system 904, when active, consumes more power than does the cache 906. The power consumption is often a concern when the media player 900 is a portable media player that is powered by a battery (not shown). The media player 900 also includes a RAM 920 and a Read-Only Memory (ROM) 922. The ROM 922 can store programs, utilities or processes to be executed in a non-volatile manner. The RAM 920 provides volatile data storage, such as for the cache 906.

The media player 900 also includes a user input device 908 that allows a user of the media player 900 to interact with the media player 900. For example, the user input device 908 can take a variety of forms, such as a button, keypad, dial, etc. Still further, the media player 900 includes a display 910 (screen display) that can be controlled by the processor 902 to display information to the user. A data bus 911 can facilitate data transfer between at least the file system 904, the cache 906, the processor 902, and the CODEC 912.

In one embodiment, the media player 900 serves to store a plurality of media items (e.g., songs) in the file system 904. When a user desires to have the media player play a particular media item, a list of available media items is displayed on the display 910. Then, using the user input device 908, a user can select one of the available media items. The processor 902, upon receiving a selection of a particular media item, supplies the media data (e.g., audio file) for the particular media item to a coder/decoder (CODEC) 912. The CODEC 912 then produces analog output signals for a speaker 914. The speaker 914 can be a speaker internal to the media player 900 or external to the media player 900. For example, headphones or earphones that connect to the media player 900 would be considered external speakers.

The media player 900 also includes a bus interface 916 that couples to a data link 918. The data link 918 allows the media player 900 to couple to a host computer.

In creating a playlist, a user can interact with a graphical user interface. The graphical user interface can be provided by, or associated with, a software application that manages media items and their playlists. Such a software application can, for example, be provided by the media manager 106 illustrated in FIG. 1A, the media manager 156 illustrated in FIG. 1B, the media application 202 illustrated in FIG. 2, or the management module 806 illustrated in FIG. 8. The specifics of the graphical user interface can vary with implementation.

Figure 10A:
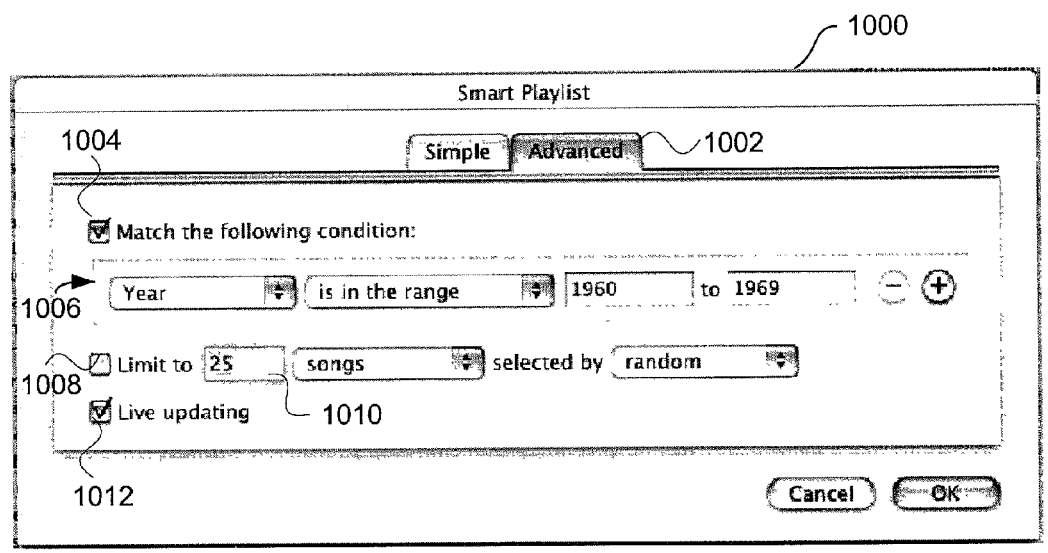
FIGS. 10A-10C are screen shots of exemplary graphical user interfaces for a user to create a playlist.
Figure 10B:
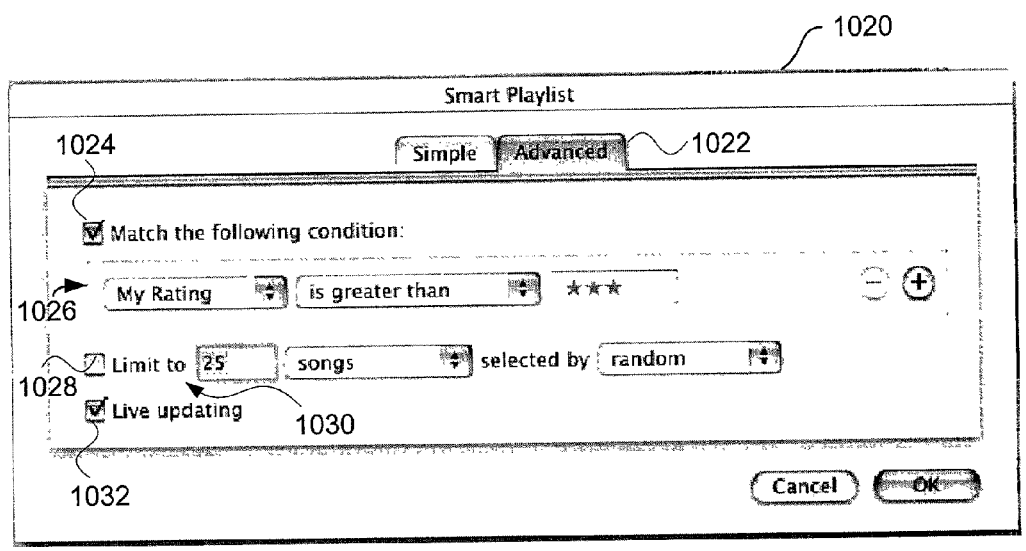
Figure 10C:
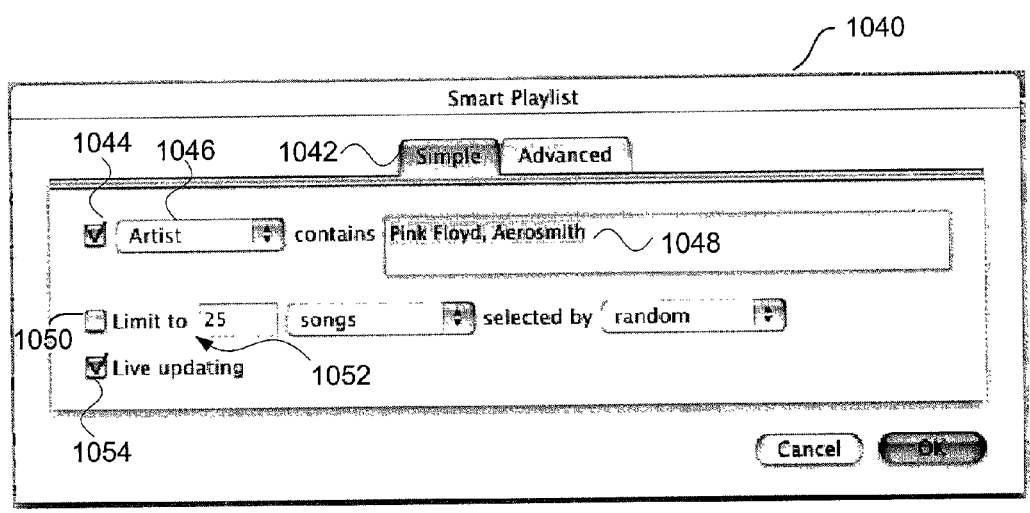

FIGS. 10A-10C are screen shots of exemplary graphical user interfaces for a user to create a playlist. These exemplary graphical user interfaces define the rules or playlist conditions for the playlist to be created.

FIG. 10A is a screen shot of a first exemplary graphical user interface 1000. The first exemplary graphical user interface 1000 facilitates creation of a first playlist using an advanced interface 1002. The advanced interface 1002 allows a user to enable filter conditions with a check box 1004. When the check box 1004 is checked, filter conditions can be established at a filter conditions entry region 1006. Typically, the filter conditions pertain to media information associated with the media items. In one implementation, the media information can be the fields of the track information of the media database shown in FIG. 3B. In this example, the filter conditions are based on a year (of creation) for media items. Specifically, the filter conditions selected or entered by the user are to select those media items that were created between the years 1960 to 1969 (e.g., 60s music). The advanced interface 1002 also allows the user to enable limit conditions with a check box 1008. When the check box 1008 is checked, limit conditions can be established at a limit condition entry region 1010. Although not enabled in this example, a limit condition can limit the number of media items (e.g., songs) in the resulting playlist and also determine the manner in which the limiting should be performed. Still further, the advanced interface 1002 allows the user to enable live updating (i.e., dynamic updating) with a check box 1012. In this example, the live updating is enabled so that the resulting playlist will be automatically updated as discussed in detail above.

FIG. 10B is a screen shot of a second exemplary graphical user interface 1020. The second exemplary graphical user interface 1020 facilitates creation of a second playlist using an advanced interface 1022. The second exemplary graphical user interface 1020 is similar to the first exemplary graphical user interface 1000 except that the filter conditions being used are different. The advanced interface 1022 allows a user to enable filter conditions with a check box 1024. When the check box 1024 is checked, filter conditions can be established at a filter conditions entry region 1026. In this example, the filter conditions are based on a user rating of the media items (e.g., 1, 2, 3, 4 or 5 star rating). Specifically the filter conditions selected or entered by the user are used to select those media items that were rated as greater than a 3 star rating. The advanced interface 1022 also allows the user to enable limit conditions with a check box 1028. When the check box 1028 is checked, limit conditions can be established at a limit condition entry region 1030. Although not enabled in this example, the limit conditions can limit the number of media items (e.g., songs) in the resulting playlist and can also determine the manner in which the limiting should be performed. Still further, the advanced interface 1022 allows the user to enable live updating (i.e., dynamic updating) with a check box 1032. In this example, the live updating is enabled so that the resulting playlist will be automatically updated as discussed in detail above.

FIG. 10C is a screen shot of a third exemplary graphical user interface 1040. The third exemplary graphical user interface 1040 facilitates creation of a third playlist using a simple interface 1042. The simple interface 1042 is less complex than the advanced interface noted above. The simple interface 1042 allows a user to enable filter conditions with a check box 1044. When the check box 1044 is checked, filter conditions can be established by selecting a field from a list of fields 1046 and entering text into a text box 1048 to be contained within the selected field. For example, the fields can be those fields of the media information, such as the fields of the track information of the media database shown in FIG. 3B. In the example shown in FIG. 10C, the selected field is "Artist" and the entered text is "Pink Floyd, Aerosmith." Hence, the resulting playlist would include all media items (i.e., music tracks) available that have Pink Floyd or Aerosmith as their artist. The simple interface 1042 also allows the user to enable limit conditions with a check box 1050. When the check box 1050 is checked, limit conditions can be established at a limit condition entry region 1052. Although not enabled in this example, the limit conditions can limit the number of media items (e.g., songs) in the resulting playlist and can also determine the manner in which the limiting should be performed. Still further, the simple interface 1042 allows the user to enable live updating (i.e., dynamic updating) with a check box 1054. In this example, the live updating is enabled so that the resulting playlist will be automatically updated as discussed in detail above.

Figure 11A:
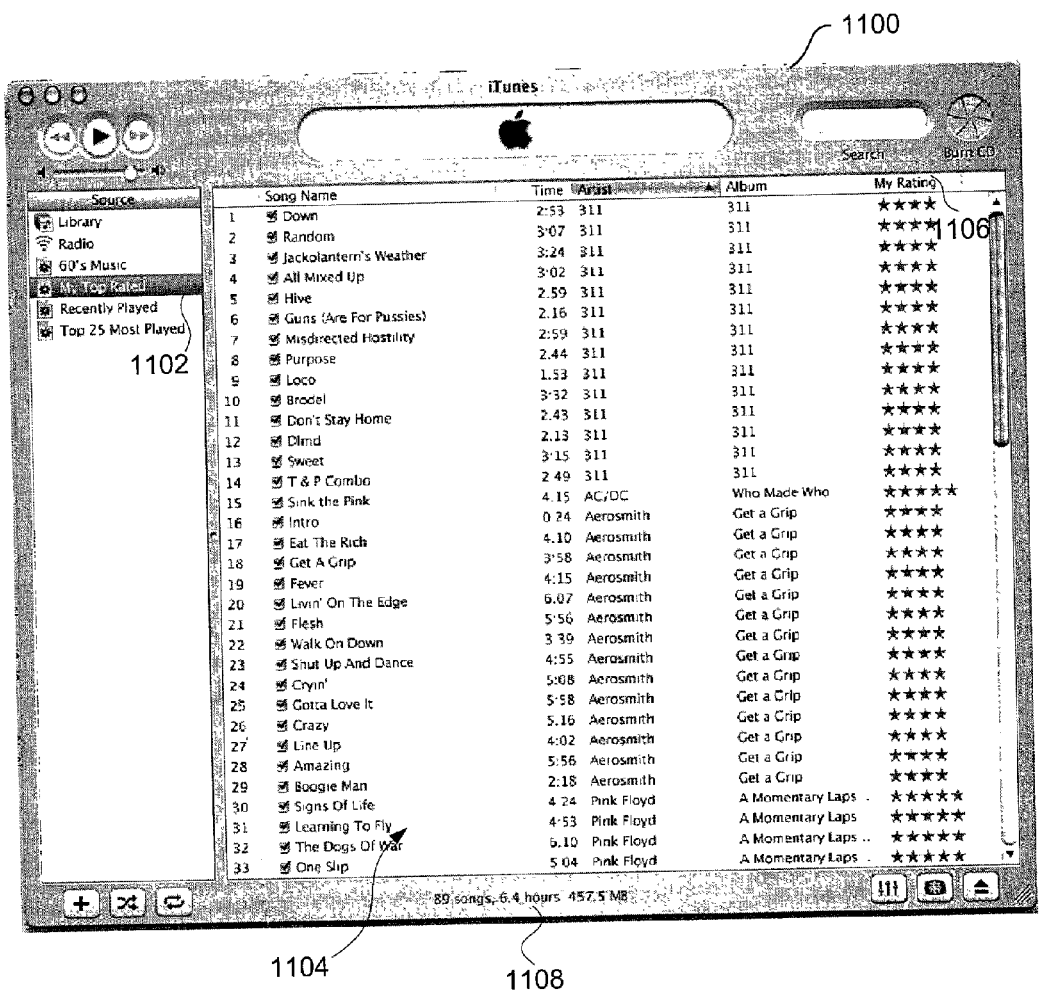
FIGS. 11A and 11B are screen shots of media items of exemplary playlists formed using the graphical user interface shown in FIG. 10B.
Figure 11B:
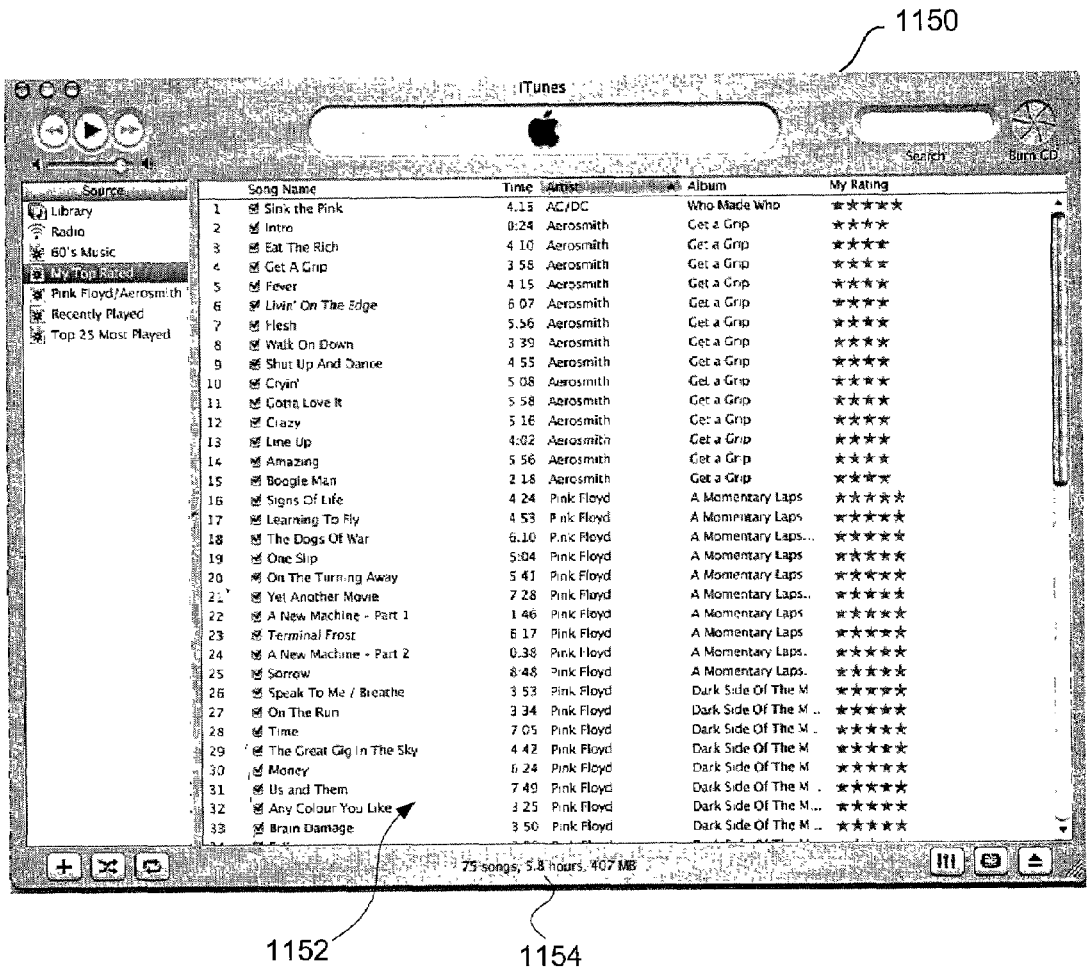

FIGS. 11A and 11B are screen shots of media items of exemplary playlists formed using the graphical user interface 1020 shown in FIG. 10B. In FIG. 11A, a screen shot 1100 depicts a playlist ("My Top Rated") as a source 1102 and a list 1104 of the media items in the playlist. Note that the star ratings in the "My Rating" field for each of the media items in the list 1104 are all greater than a 3-star rating. A size indication 1108 indicates that the playlist has 85 songs, has a play time of 6.4 hours, and consumes 457.5 MBs of data storage. As an example of live (or dynamic) updating of the playlist ("My Top Rated"), assume that after the playlist shown in FIG. 11A is created, the source ("library") is altered by the user demoting the star rating of all media items by artist "311" to 3-stars. Previously, as shown in FIG. 11A, these media items had a 4-star rating. Hence, once these rating changes were made, the media items from artist "311" no longer satisfy the playlist conditions (e.g., filter criteria) for the playlist ("My Top Rated"). Accordingly, following the automatic updating of the playlist ("My Top Rated"), the updated playlist no longer includes the artist "311" media items. FIG. 11B depicts a screen shot 1150 depicts the playlist ("My Top Rated") after the automatic updating has been performed. The listing 1152 of the media items indeed no longer include any of the media items from artist "311". This is achieved without any user actions to alter the playlist. A size indication 1154 for the updated playlist indicates that the playlist now has 75 songs, has a play time of 5.8 hours, and consumes 407 MBs of data storage.

Although the media items of emphasis in several of the above embodiments were audio items (e.g., audio files or songs), it should be understood that the media items are not limited to audio items. For example, the media item can alternatively pertain to videos (e.g., movies) or images (e.g., photos).

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that playlists are able to be updated so as to remain current with respect to available media items. Another advantage of the invention is that playlists are able to be automatically updated without user interaction. Still another advantage of the invention is that a graphical user interface can be used to assist a user in creating playlists that can be dynamically updated based on user-specified rules (e.g., filter, sort and limit criteria).

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for automatically updating a playlist on a media play system, said method being performed by the media play system which includes a processor and a memory, said method comprising:
   determining whether new media content has been added to a media content library available to the media play system;
   determining whether the playlist is affected by the added new media content to the media content library available to the media play system; and
   automatically regenerating the playlist when said determining determines that the new media content has been added to the media content library available to the media play system,
   wherein the playlist has at least one playlist condition associated therewith,
   wherein said regenerating operates to regenerate the playlist using the at least one playlist condition,
   wherein said regenerating is performed only when said determining determines that the new media content has been added to the media content library available to the media play system and when said determining determines that the playlist is affected by the added new media content to the media content library available to the media play system, and
   wherein said regenerating is initiated without requiring user interaction to initiate such regeneration.

2. A computer-implemented method as recited in claim 1, wherein the playlist has at least one playlist condition associated therewith, and
   wherein said regenerating operates to regenerate the playlist using the at least one select playlist condition.

3. A computer-implemented method as recited in claim 1, wherein said method further comprises:
   subsequently displaying the playlist after said regenerating.

4. A computer-implemented method as recited in claim 1, wherein said method further comprises:
   re-drawing the playlist after said regenerating when the playlist is already being displayed.

5. A computer-implemented method as recited in claim 1, wherein the at least one playlist condition includes at least one filter criteria, and
   wherein said regenerating operates to regenerate the playlist using the at least one filter criteria.

6. A computer-implemented method as recited in claim 1, wherein the at least one playlist condition includes at least one filter criteria and at least one limit criteria, and
   wherein said regenerating operates to regenerate the playlist using the at least one filter criteria and the at least one limit criteria.

7. A computer-implemented method as recited in claim 6, wherein the limit criteria is a numerical limit imposed on the number of items in the playlist or the duration of the playlist.

8. A computer-implemented method as recited in claim 1, wherein the media content comprises media items and media information.

9. A computer-implemented method as recited in claim 8, wherein the media items pertain to one or more of audio, video or images.

10. A computer-implemented method as recited in claim 1, wherein the media play system comprises a personal computer.

11. A computer-implemented method as recited in claim 1, wherein said regenerating is performed as a background process after a series of distinct alterations have been made to the media content available to the media play system.

12. A computer-implemented method as recited in claim 11, wherein the background process is performed when the media play system is in an idle state.

13. A computer-implemented method as recited in claim 1, wherein the media content library stores a plurality of media items, and said method further comprises:
   determining whether a media item is provided within the media content library; and
   automatically regenerating the playlist when said determining determines that the media item has been deleted from the media content library.

14. A computer-implemented method for updating a playlist on a media player, said method being performed by the media player which includes a processor and a memory, said method comprising:
  receiving playlist rules to be used to create the playlist, the playlist rules including at least one filter criteria and at least one limit criteria;
  producing a playlist from a plurality of available media items in a media library and the playlist rules;
  subsequently automatically determining whether the playlist should be re-produced due to addition of new media items to the media library; and
  rebuilding the playlist from the plurality of available media items in the media library and the playlist rules when said determining determines that the playlist should be re-produced,
  wherein said rebuilding of the playlist is initiated without requiring user interaction to initiate such rebuilding,
  wherein said producing and said rebuilding operate to produce the playlist using the at least one filter criteria and the at least one limit criteria, and
  wherein the at least one limit criteria includes or has a sort criteria associated therewith.

15. A computer-implemented method as recited in claim 14, wherein the media items pertain to one or more of audio, video or images, and wherein the limit criteria is a numerical limit imposed on the number of media items in the playlist or the duration of the playlist.

16. A computer-implemented method as recited in claim 14, wherein the media player comprises a personal computer.

17. A computer-implemented method as recited in claim 14, wherein the limit criteria is a numerical limit imposed on the number of media items in the playlist or the duration of the playlist.

18. A computer readable storage medium including at least computer program code stored thereon for automatically updating a list of media items maintained by a media system, said computer readable medium comprising:
  computer program code for automatically determining whether at least one new media item has been added to a media content library available to the media system;
  computer program code for determining whether the list of media items is affected by the at least one media item being added to the media content library available to the media system; and
  computer program code for regenerating the list of media items when said computer program code for determining determines that at least one new media item has been added to the media content library available to the media system,
  wherein the list of media items has at least one list condition associated therewith,
  wherein said computer program code for regenerating operates to regenerate the list of media items using the at least one list condition,
  wherein said computer program code for regenerating operates to regenerate the list of media items only when said computer program code for determining determines that the list of media items is affected by the at least one media item being added the media content library available to the media system, and
  wherein said computer program code for regenerating operates without requiring user interaction to initiate such regeneration.

19. A computer readable medium as recited in claim 18, wherein the at least one condition references at least one field, and
  wherein said computer program code for determining whether the list of media items is affected by the at least one media item being added to the media content library available to the media system comprises computer program code for evaluating whether one or more fields of the at least one media item that has been added to the media content library available to the media system has been altered with reference to the at least one field referenced by the at least one condition associated with the list of media items.

20. A computer readable medium as recited in claim 18, wherein the list of media items has at least one list condition associated therewith, and
  wherein said computer program code for regenerating operates to regenerate the list of media items using the at least one list condition.

21. A computer readable medium as recited in claim 18, wherein said computer readable medium further comprises:
  computer program code for subsequently displaying the list of media items after being regenerated.

22. A computing device, comprising:
  a display for displaying a graphical user interface;
  a data storage device for storing a playlist and media content library for a plurality of media items, the playlist being associated with one or more of the media items; and
  a processor configured to determine whether a new media item has been added to the media content library, determine whether the playlist is affected by the added new media item to the media content library, and regenerate the playlist when said processor determines that the added new media item to the media content library available to said computing device affects the playlist,
  wherein the regeneration of the playlist is performed automatically by said processor when it is determined that the new media item has been added to the media content library available to the media play system and when said processor determines that the playlist is affected by the added new media item of the media content library, whereby the regeneration of the playlist is initiated without requiring user interaction to initiate such regeneration,
  wherein the playlist has playlist conditions associated therewith, the playlist conditions including at least one filter criteria and at least one limit criteria, and
  wherein the regeneration of the playlist by said processor operates to regenerate the playlist using the at least one filter criteria and the at least one limit criteria.

23. A computing device as recited in claim 22, wherein said processor is further configured to subsequently synchronize the playlist with a mobile electronic device temporarily connected with said computing device, whereby the playlist once regenerated is automatically copied to the mobile electronic device.

24. A computing device as recited in claim 23, wherein said computing device is a personal computer.

25. A computing device as recited in claim 22, wherein the limit criteria is one or more of (i) a limit on total number of tracks in the playlist, (ii) a limit on a total duration of the playlist, or (iii) a limit on a total size of the playlist.

26. A computing device as recited in claim 22, wherein the playlist has at least one playlist condition associated therewith, and
  wherein the regeneration of the playlist by said processor operates to regenerate the playlist using the at least one playlist condition.

* * * * *

UNITED STATES PATENT AND TRADEMARK OFFICE
CERTIFICATE OF CORRECTION

PATENT NO. : 7,797,446 B2  
APPLICATION NO. : 10/198639  
DATED : September 14, 2010  
INVENTOR(S) : David Heller et al.

Page 1 of 1

It is certified that error appears in the above-identified patent and that said Letters Patent is hereby corrected as shown below:

Title page 3, in column 2, under "Other Publications", line 54, delete "Columist" and insert -- Columnist --, therefor.

In column 18, line 39, in claim 22, delete "of" and insert -- to --, therefor.

In column 18, line 57, in claim 25, after "more of" insert -- : --.

Signed and Sealed this  
Eighth Day of November, 2011

David J. Kappos  
*Director of the United States Patent and Trademark Office*